(12) United States Patent
Morgan et al.

(10) Patent No.: US 12,292,127 B2
(45) Date of Patent: *May 6, 2025

(54) PRESSURE RELIEF DEVICE

(71) Applicant: Agility Fuel Systems LLC, Costa Mesa, CA (US)

(72) Inventors: David Neil Morgan, Weston, NE (US); Michael Gregory Volkmer, Lincoln, NE (US); Chad Alvin Cederberg, Lincoln, NE (US); Glen Edward Lampe, Lincoln, NE (US)

(73) Assignee: Agility Fuel Systems LLC, Costa Mesa, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 18/319,675

(22) Filed: May 18, 2023

(65) Prior Publication Data

US 2023/0287984 A1 Sep. 14, 2023

Related U.S. Application Data

(63) Continuation of application No. 17/456,004, filed on Nov. 22, 2021, now Pat. No. 11,692,635, which is a
(Continued)

(51) Int. Cl.
*F16K 17/02* (2006.01)
*F17C 13/04* (2006.01)

(52) U.S. Cl.
CPC ............ *F16K 17/025* (2013.01); *F17C 13/04* (2013.01); *F17C 2205/0332* (2013.01);
(Continued)

(58) Field of Classification Search
CPC ............. F17C 2205/0332; F16K 17/38; F16K 17/383; F16K 17/386

See application file for complete search history.

(56) References Cited

U.S. PATENT DOCUMENTS 1,515,081 A * 11/1924 Toelle .................. F16K 17/383
251/74
2,072,577 A 3/1937 Allen
(Continued)

FOREIGN PATENT DOCUMENTS

CA 3067266 A1 12/2018
DE 3940843 A1 6/1991
(Continued)

OTHER PUBLICATIONS

International Search Report and Written Opinion issued in PCT Application No. PCT/US2020/061982, dated Mar. 5, 2021, in 12 pages.

*Primary Examiner* — Paul J Gray
(74) *Attorney, Agent, or Firm* — Knobbe, Martens, Olson & Bear, LLP

(57) ABSTRACT

A pressure relief valve configured to vent a pressurized tank in the event of a fire is provided. The pressure relief valve includes a body, a vent passage, a plug and a latch. The vent passage is disposed through the body. The vent passage can be placed in fluid communication with an internal volume of a tank and with the atmosphere. The plug is moveably mounted in the vent passage. The latch has a blocking member disposed in contact with a control end of the plug in a first configuration and out of contact with the control end in a second configuration. The second configuration allows movement of the plug in the vent passage. One or both of a shape memory alloy wire and a trigger piston is configured to actuate the latch from the first to the second configuration. The shape memory alloy wire is configured to shorten when exposed to a temperature above a threshold temperature. The trigger piston moves, e.g., by a pressurized gas, in a trigger actuation passage to actuate the latch from the first configuration to the second configuration.

23 Claims, 32 Drawing Sheets

Related U.S. Application Data continuation of application No. 17/138,391, filed on Dec. 30, 2020, now Pat. No. 11,187,336, which is a continuation of application No. PCT/US2020/061982, filed on Nov. 24, 2020.

(60) Provisional application No. 62/939,993, filed on Nov. 25, 2019.

(52) U.S. Cl.
CPC .. *F17C 2221/033* (2013.01); *F17C 2260/042* (2013.01); *F17C 2270/0168* (2013.01)

(56) References Cited

U.S. PATENT DOCUMENTS

| | | | |
|---|---|---|---|
| 2,557,199 A | 6/1951 | Olson | |
| 3,043,331 A | 7/1962 | Peters | |
| 4,224,994 A | 9/1980 | Tone et al. | |
| 4,577,607 A | 3/1986 | Nishio | |
| 4,608,208 A | 8/1986 | Yogo et al. | |
| 4,699,171 A | 10/1987 | Sugden | |
| 4,717,072 A | 1/1988 | Girardin | |
| 5,042,520 A | 8/1991 | Reznik | |
| 5,131,424 A | 7/1992 | Heidorf et al. | |
| 5,211,371 A | 5/1993 | Coffee | |
| 5,255,809 A | 10/1993 | Ervin et al. | |
| 5,263,824 A | 11/1993 | Waldbeser et al. | |
| 5,341,844 A | 8/1994 | Wass et al. | |
| 5,345,963 A | 9/1994 | Dietiker | |
| 5,522,428 A | 6/1996 | Duvall | |
| 5,531,275 A | 7/1996 | Sundholm | |
| 5,562,117 A | 10/1996 | Borland et al. | |
| 5,632,297 A | 5/1997 | Sciullo et al. | |
| 5,657,824 A | 8/1997 | Sundholm | |
| 5,788,212 A | 8/1998 | Hackman et al. | |
| 6,112,760 A | 9/2000 | Scott et al. | |
| 6,202,688 B1 | 3/2001 | Khadim | |
| 6,247,678 B1 | 6/2001 | Hines et al. | |
| 6,257,360 B1 | 7/2001 | Wozniak et al. | |
| 6,260,516 B1 | 7/2001 | Brister | |
| 6,269,830 B1 | 8/2001 | Ingle | |
| 6,321,775 B1 | 11/2001 | Hildebrand et al. | |
| 6,367,573 B1 | 4/2002 | Scott | |
| 6,382,232 B1 | 5/2002 | Portmann | |
| 6,397,791 B1 | 6/2002 | Brister | |
| 6,418,962 B1 | 7/2002 | Wozniak et al. | |
| 6,679,263 B2 | 1/2004 | Luchetti et al. | |
| 6,691,683 B2 | 2/2004 | Gracyalny et al. | |
| 6,793,199 B2 | 9/2004 | Bushik et al. | |
| 6,840,257 B2 | 1/2005 | Dario et al. | |
| 6,843,465 B1 | 1/2005 | Scott | |
| 6,871,802 B2 | 3/2005 | Stilwell et al. | |
| 6,877,718 B2 | 4/2005 | Nimberger | |
| 7,487,826 B2 | 2/2009 | Pineo et al. | |
| 7,762,272 B2 | 7/2010 | Delfino et al. | |
| 7,815,161 B2 | 10/2010 | Saitoh et al. | |
| 7,971,651 B2 | 7/2011 | Tanju et al. | |
| 8,051,915 B2 * | 11/2011 | Blease | F16K 17/386 169/17 |
| 8,096,708 B2 | 1/2012 | Harrington | |
| 8,414,366 B2 | 4/2013 | Browne et al. | |
| 8,511,334 B2 | 8/2013 | Sparschuh | |
| 8,550,105 B2 | 10/2013 | Ishitoya et al. | |
| 8,567,757 B2 | 10/2013 | Pitchford et al. | |
| 8,646,540 B2 | 2/2014 | Eckholm et al. | |
| 8,668,110 B1 | 3/2014 | Traxler et al. | |
| 8,714,199 B2 | 5/2014 | Deperraz et al. | |
| 8,720,722 B2 | 5/2014 | Sunday et al. | |
| 8,807,256 B2 | 8/2014 | Gibb et al. | |
| 8,820,069 B2 | 9/2014 | Makinson et al. | |
| 8,844,662 B2 | 9/2014 | Tsubokawa | |
| 8,851,443 B2 | 10/2014 | Foshansky | |
| 8,915,322 B2 | 12/2014 | Gibb et al. | |
| 9,097,358 B2 | 8/2015 | Girouard | |
| 9,121,521 B2 | 9/2015 | Girouard | |
| 9,404,598 B2 | 8/2016 | Girouard | |
| 9,682,618 B2 | 6/2017 | Baik et al. | |
| 10,942,533 B2 | 3/2021 | Hawkins et al. | |
| 11,187,336 B2 | 11/2021 | Morgan et al. | |
| 11,260,744 B2 | 3/2022 | Volkmer et al. | |
| 11,692,635 B2 | 7/2023 | Morgan et al. | |
| 2001/0042534 A1 | 11/2001 | Brister | |
| 2009/0078706 A1 | 3/2009 | Ishitoya et al. | |
| 2009/0288713 A1 | 11/2009 | Hirakata | |
| 2011/0083756 A1 | 4/2011 | Hwang et al. | |
| 2012/0011843 A1 | 1/2012 | Makinson et al. | |
| 2012/0199764 A1 | 8/2012 | Girouard | |
| 2012/0228307 A1 | 9/2012 | Simmons | |
| 2013/0112295 A1 | 5/2013 | McNicholas | |
| 2013/0118456 A1 | 5/2013 | Gutscher et al. | |
| 2014/0110613 A1 | 4/2014 | Pitchford et al. | |
| 2014/0251479 A1 | 9/2014 | Gibb et al. | |
| 2014/0312683 A1 | 10/2014 | McNicholas | |
| 2016/0033085 A1 | 2/2016 | Sirosh et al. | |
| 2017/0167925 A1 | 6/2017 | Safai et al. | |
| 2017/0340911 A1 | 11/2017 | Meyer et al. | |
| 2018/0037107 A1 | 2/2018 | Baik et al. | |
| 2018/0266577 A1 | 9/2018 | Garg | |
| 2020/0017352 A1 | 1/2020 | Yang et al. | |
| 2020/0198458 A1 | 6/2020 | Volkmer et al. | |
| 2022/0082173 A1 | 3/2022 | Morgan et al. | |

FOREIGN PATENT DOCUMENTS

| | | |
|---|---|---|
| DE | 4132741 A1 | 4/1993 |
| DE | 693 11 502 T2 | 10/1997 |
| DE | 10 2017 200467 | 7/2018 |
| EP | 2 000 719 A1 | 12/2008 |
| JP | 2006-523514 | 10/2006 |
| KR | 2000-0039103 | 7/2000 |
| KR | 2006-808171 | 8/2004 |
| KR | 10-2009-0035115 | 4/2009 |
| KR | 10-2010-0048638 | 5/2010 |
| KR | 10-2011-0058980 | 6/2011 |
| WO | WO 2003/038332 | 5/2003 |
| WO | WO 2003/106272 | 12/2003 |
| WO | WO 2004/014683 A1 | 2/2004 |
| WO | WO 2008/010045 | 1/2008 |
| WO | WO 2010/101976 A1 | 9/2010 |
| WO | WO 2016/019057 | 2/2016 |
| WO | WO 2016/086326 | 6/2016 |
| WO | WO 2016/126958 | 8/2016 |
| WO | WO 2019/055711 | 3/2019 |
| WO | WO 2021/108387 | 6/2021 |

\* cited by examiner

PRESSURE RELIEF DEVICE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application relates to inventive pressure relief devices, including inventive valves and systems for controlling high pressure storage system incorporating inventive pressure relief devices.

Description of the Related Art

Various applications involve storing high pressure gases. For example, natural gas fuel systems for automobiles store natural gas at high pressure in specialized tanks. Certain precautions have been developed to address safety concerns with storing natural gas at high pressure. Such precautions can include devices that vent the high pressure gas to reduce the pressure in the tank in the event of an emergency.

SUMMARY OF THE INVENTION

A need exists to provide improved emergency countermeasures, including improved pressure relief valves. These improvements preferably provide a wider range of detection of emergency situations, such as fire, and also faster response to such situations.

In one embodiment a gas containment system is provided. The gas containment system includes a tank and a pressure relief valve. The tank has an internal volume configured to be pressurized with a gas and an orifice configured to permit gas to flow out of and/or into the internal volume. The pressure relief valve is configured to vent the tank in the event of a fire. The pressure relief valve includes a vent passage, a plug moveably mounted in the vent passage, a latch and a trigger assembly. The vent passage has a first end configured to be in fluid communication with the orifice and thereby with the internal volume of the tank to allow gas from the tank to flow out of the tank into the pressure relief valve. The plug has a first portion forming a seal with a wall of the vent passage and a second portion spaced apart from the first portion. The latch has a first configuration in which a portion of the latch is in contact with the second portion of the plug to block movement of the plug and a second configuration that allows movement of the plug in the vent passage. The trigger assembly has a fire detection portion and a latch control portion. The fire detection portion has an elongate body. Upon being exposed to heat above a threshold, the fire detection portion causes the latch control portion to permit the latch to move from the first configuration to the second configuration to allow gas in the tank to flow to a second end of the vent passage and out of the pressure relief valve.

In another example, a pressure relief valve is provided that is configured to vent a pressurized tank in the event of a fire. The pressure relief valve has a body, a vent passage disposed through the body and a plug moveably mounted in the vent passage. The vent passage has a first end configured to be placed in fluid communication with an internal volume of a tank and a second end configured to be placed in fluid communication with the atmosphere. The vent passage is at least partially enclosed by a vent passage wall. The plug has a seal end forming a seal with the vent passage wall and a control end spaced apart from the seal end. The pressure relief valve also includes a latch that has a blocking member disposed in contact with the control end of the plug in a first configuration. The latch is moveable such that the blocking member is out of contact with the control end of the plug in a second configuration to allow movement of the plug in the vent passage. The pressure relief valve also includes a shape memory alloy wire that has a first length disposed in the body of the pressure relief valve and a second length disposed outside the body of the pressure relief valve. The shape memory alloy wire is configured to shorten when exposed to a temperature above a threshold temperature. Upon being exposed to heat above a threshold, the second length of the shape memory wire is shortened to allow the latch to be actuated from the first configuration to the second configuration. Actuation from the first configuration to the second configuration allows the plug to move in the vent passage to allow gas in the tank to flow through the pressure relief valve to the second end of the vent passage and out of the pressure relief valve to the atmosphere.

In another embodiment a pressure relief valve is provided. The pressure relief valve is configured to vent a pressurized tank in the event of a fire. The pressure relief valve has a body, a vent passage disposed through the body, and a plug moveably mounted in the vent passage. The vent passage has a first end configured to be placed in fluid communication with an internal volume of a tank and a second end configured to be placed in fluid communication with the atmosphere. The vent passage is at least partially enclosed by a vent passage wall. The plug has a seal end forming a seal with the vent passage wall and a control end spaced apart from the seal end. The pressure relief valve also includes a latch that has a blocking member disposed in contact with the control end of the plug in a first configuration. The latch is moveable such that the blocking member is out of contact with the control end of the plug in a second configuration. The second configuration allows movement of the plug in the vent passage. The pressure relief valve also includes a trigger actuation passage and a trigger piston disposed in the trigger actuation passage. The trigger actuation passage has a first end configured to be in fluid communication with a pressurized gas and a second end disposed opposite the first end. The trigger piston has an upstream end and a triggering end opposite the upstream end. When the pressurized gas is introduced into the trigger actuation passage and pressure is applied to the upstream end of the trigger piston, the trigger piston moves in the trigger actuation passage, whereby the triggering end causes the latch to be actuated from the first configuration to the second configuration.

BRIEF DESCRIPTION OF THE DRAWINGS

The abovementioned and other features of the inventions disclosed herein are described below with reference to the drawings of the preferred embodiments. The illustrated embodiments are intended to illustrate, but not to limit the inventions. The drawings contain the following figures.

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application discloses a number of improvements in pressure relief devices, e.g., valves, venting systems incorporating pressure relief devices, and fuel systems and vehicles incorporating pressure relief devices and pressure relief systems. Such improvements provide more rapid and more reliable venting of fuel tanks and other pressurized containers in emergency conditions.

Figure 1:
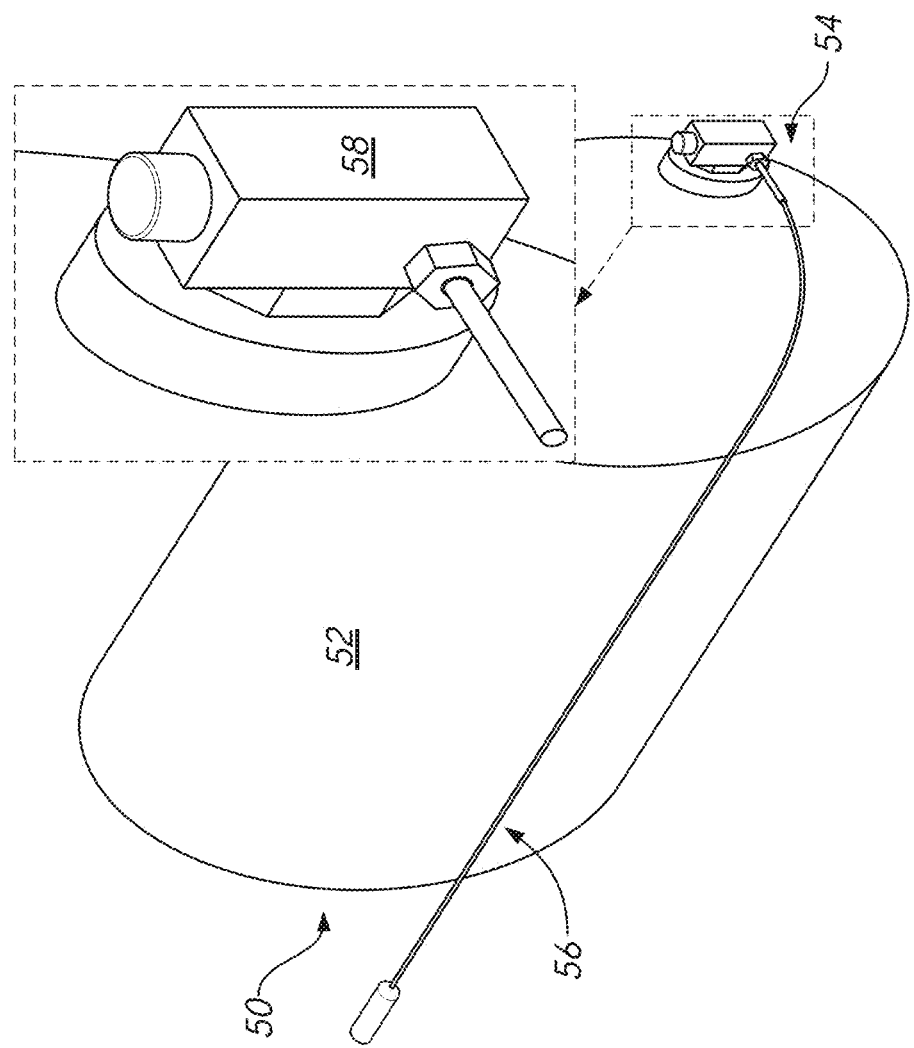
FIG. 1 is a perspective view of a gas containment system including a tank and a pressure relief device.

FIG. 1 shows a fuel system 50 that includes a fuel tank 52 and a pressure relief device 54. The tank 52 can be configured to store a volume of fuel that is sufficient to supply an engine that can generate power by burning the fuel. In some cases, the tank 52 is one of a plurality of tanks in the fuel system 50, as discussed further below. The pressure relief device 54 is provided to mitigate emergency situations in which fuel or other contents of the tank 52 might be uncontrollably and potentially explosively released. The pressure relief device 54 can be configured with a fuse 56 and a valve 58. The fuse 56 can be an elongate member that responds to a particular emergency condition, such as excessive heat to trigger, e.g., to open, the valve 58. The valve 58 can be triggered to open a passage in the valve to allow the contents of the tank 52 to flow through the passage to the atmosphere, sometimes referred to as venting. The outflow of the valve 58 can be in fluid communication with an exhaust conduit, which is not shown in FIG. 1 but which can extend to an elevation above an operator area, e.g., a vehicle cab or where a vehicle operator may be standing.

Figure 1A:
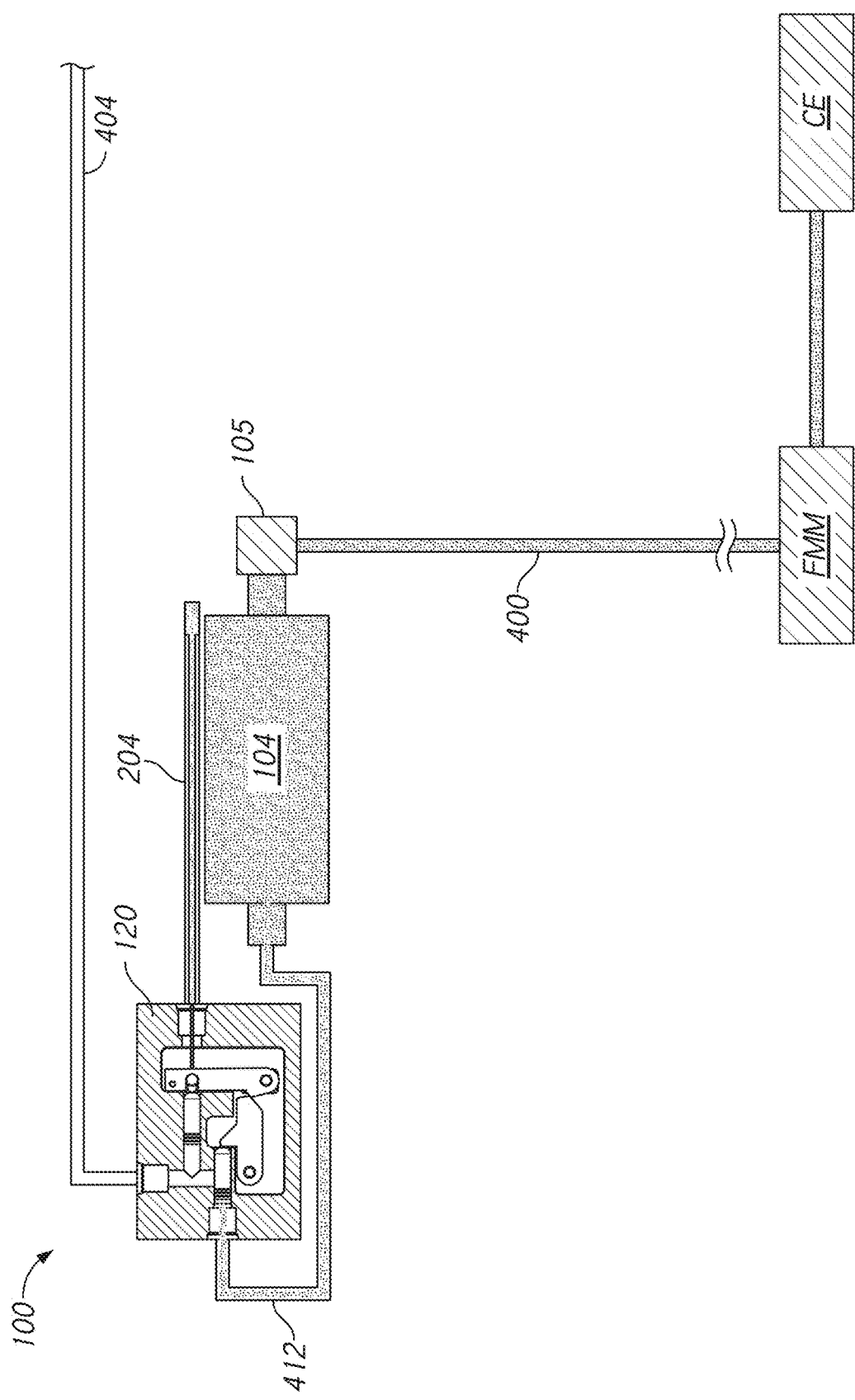
FIG. 1A is a schematic view of a fuel system including a pressure relief device configured to be actuated by a load applied by an elongate body.

FIG. 1A shows an embodiment of a gas containment system 100 that can include some features of the fuel system 50 along with additional features. The gas containment system 100 includes a tank 104, a valve 105, a fuel management module FMM, and a combustion engine CE connected to the tank 104 by a fuel supply line 400. The fuel supply line 400 can extend from an outlet of the tank 104 to an inlet of the combustion engine CE. A relief valve inlet passage 412 extends from an outlet of the tank 104 to a pressure relief valve 120 according to one embodiment, to a pressure relief valve 520 discussed below in connection with FIGS. 13-15, or to other variations of the pressure relief valves disclosed herein or covered by the claims hereof. The gas containment system 100 can include a fire detection portion 204 that can be configured to open a passage in the pressure relief valve 120, e.g., by actuating a seal from a closed position in a venting position when venting is desired. The fire detection portion 204 can include structure to automatically apply a load, such as a shape memory wire configured to change length, a motor, or a solenoid or other device to cause or permit the vent to open. The fire detection portion 204 can include an elongate body that can extend along a surface of the tank 104, e.g., in a linear fashion, or can be wrapped around the tank to provide additional coverage of the tank.

Figure 2:
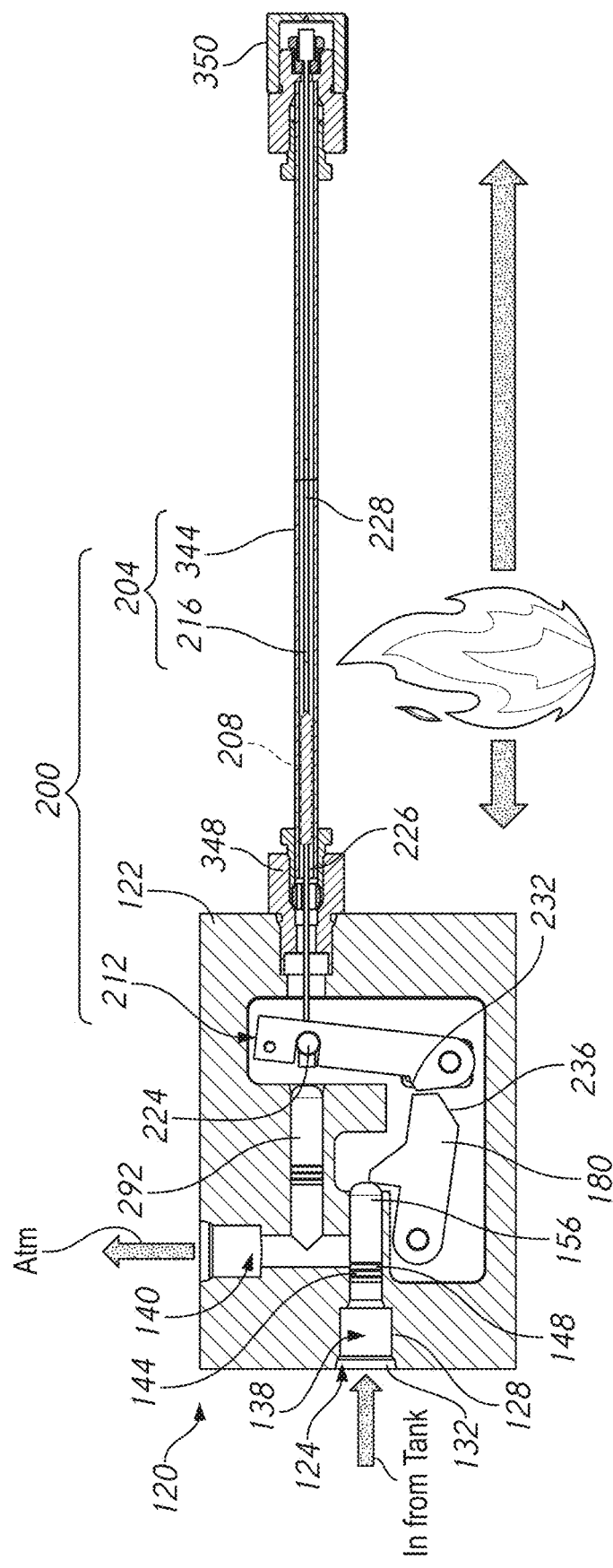
FIG. 2 is a schematic view of a pressure relief device that can be incorporated into a system including a pressure vessel.

FIG. 2 shows internal features of the pressure relief valve 120 and the fire detection portion 204 in more detail. The pressure relief valve 120 includes a body 122 forming an external surface of the pressure relief valve 120. The body 122 can be of a rigid block formation with an internal surface having a number of fluid passages formed therein. The body 122 can be made of two sections, e.g., halves, that are secured together around components that operate within an internal volume defined by the interior surfaces of the body 122. A vent passage 124 can be provided in the body 122. The vent passage 124 is enclosed by a wall 128. The vent passage 124 extends from a first end 132 to a second end 136 opposite the first end 132. The wall 128 can enclose a length of the vent passage 124 adjacent to the first end 132 or the entirety of the vent passage 124 from the first end 132 to the second end 136. A wall can similarly enclose a portion of the vent passage 124 adjacent to the second end 136. The first end 132 can be formed on one side of the body 122. The second end 136 can be formed on another side of the body 122, e.g., on perpendicular sides such that the flow path has a bend, e.g., a ninety degree bend therein. The vent passage 124 could be straight through the body 122 or have any shape so long as fluid communication can between the first end 132 and the second end 136.

In one embodiment, the vent passage 124 includes a first branch 138 and a second branch 140. The first branch 138 can be disposed upstream of the second branch 140. A gas vented through the vent passage 124 may pass through the first branch 138 initially and then flow to the second branch 140 when venting. In some cases, the first branch 138 can be exposed to gas pressure in normal operation. In other words, uninhibited fluid communication can be provided between the internal volume of the tank 104 and the first branch 138. In such a case, the same pressure in the tank 104 is found in the first branch 138 when the pressure relief valve 120 is in a closed state. In other cases additional valves may be provided upstream of the first branch 138, e.g., between the first branch 138 and the internal volume of the tank 104.

Figure 3:
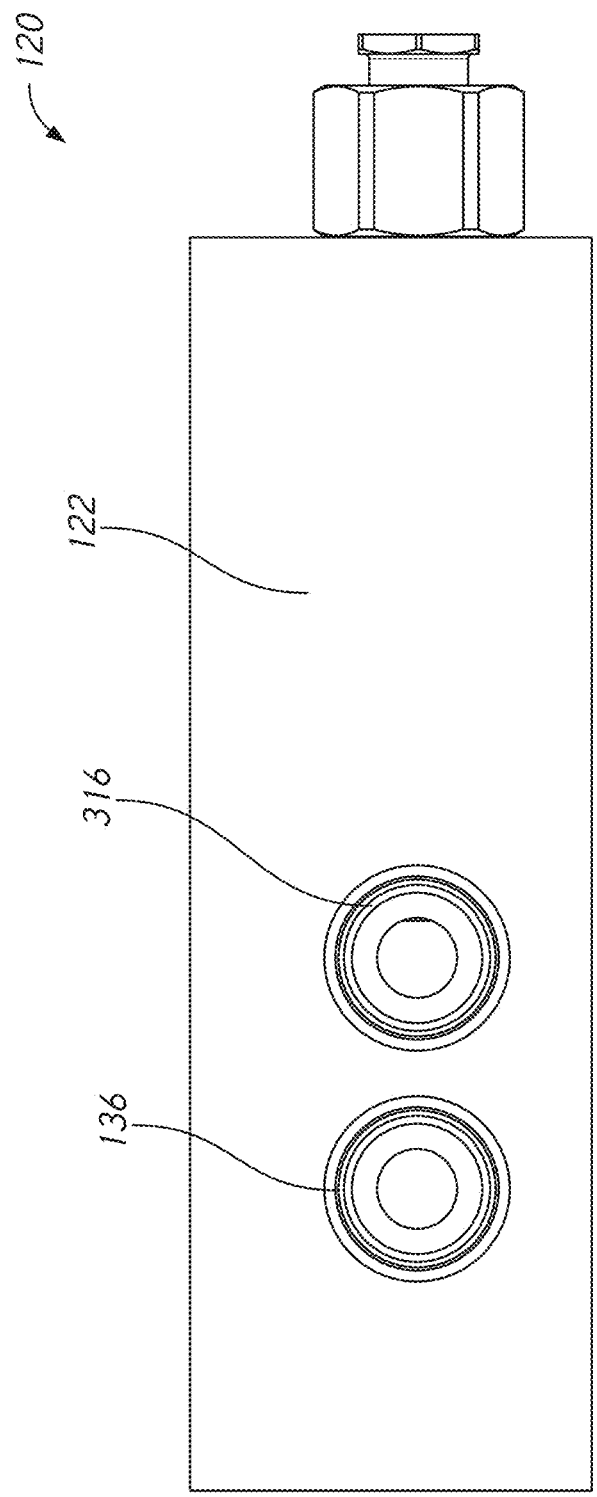
FIGS. 3-3D provide various views of one example of a pressure relief device.
Figure 3A:
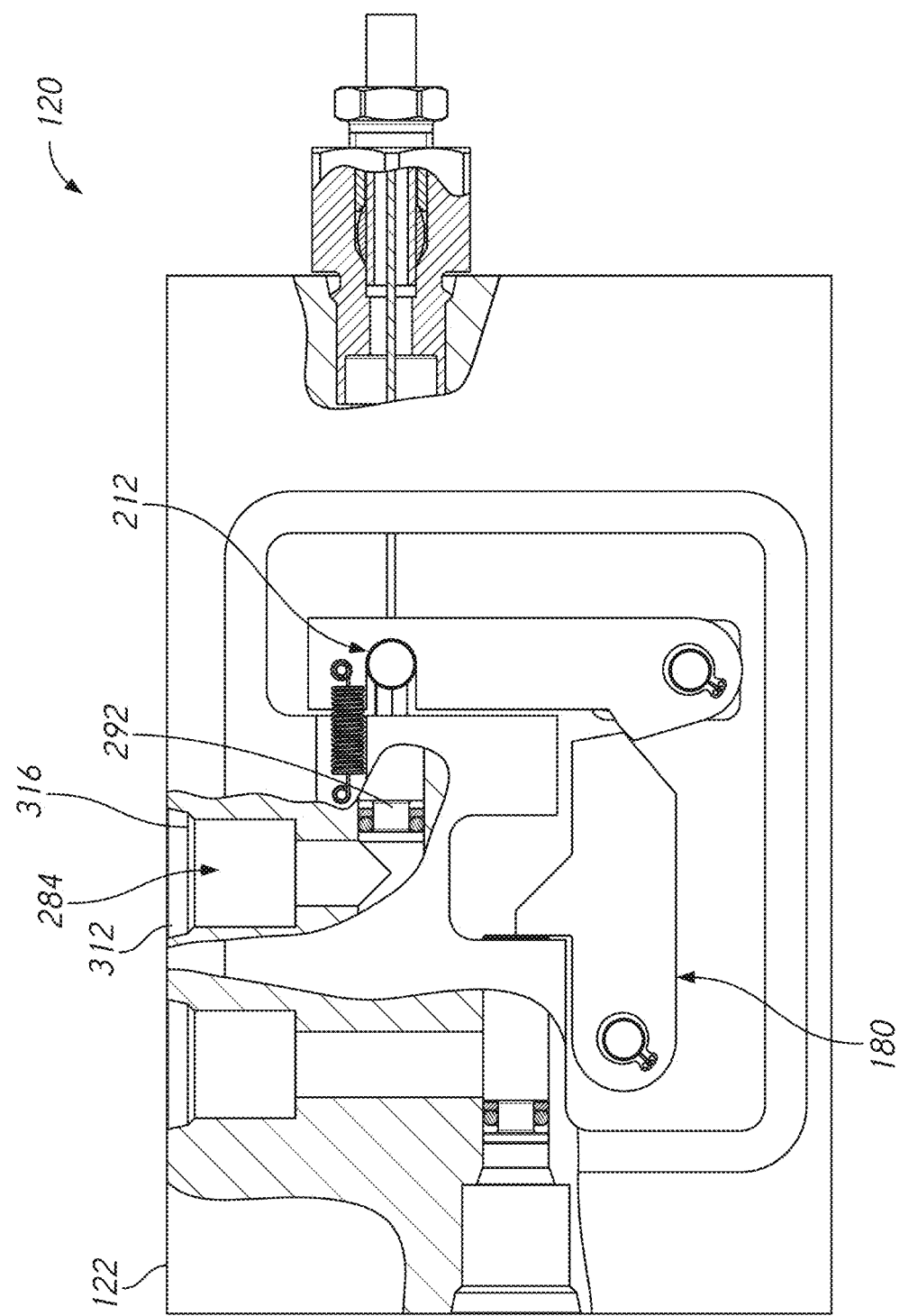
Figure 3B:
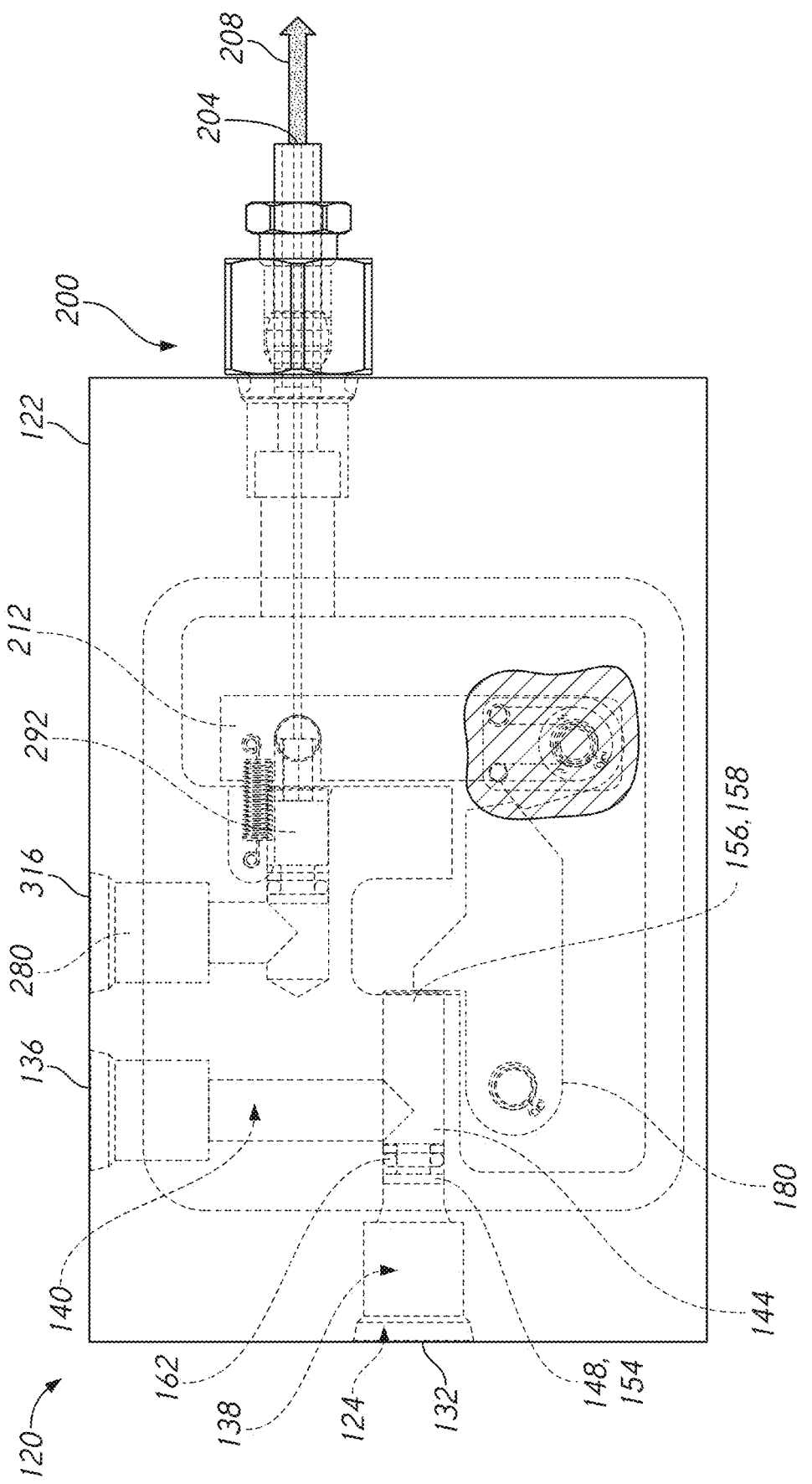
Figure 3C:
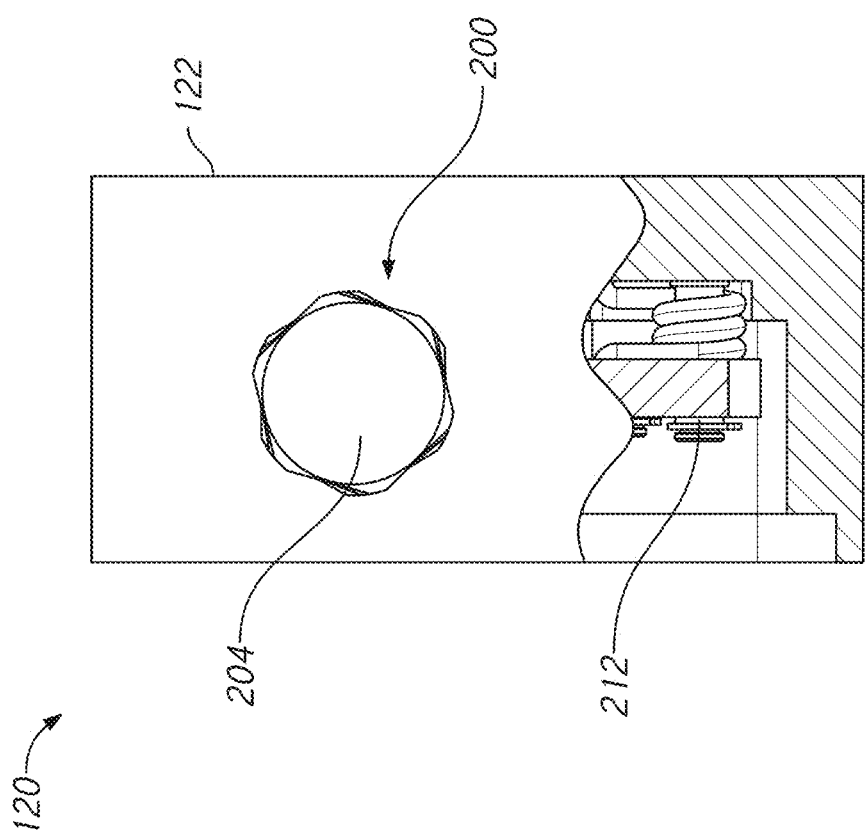
Figure 3D:
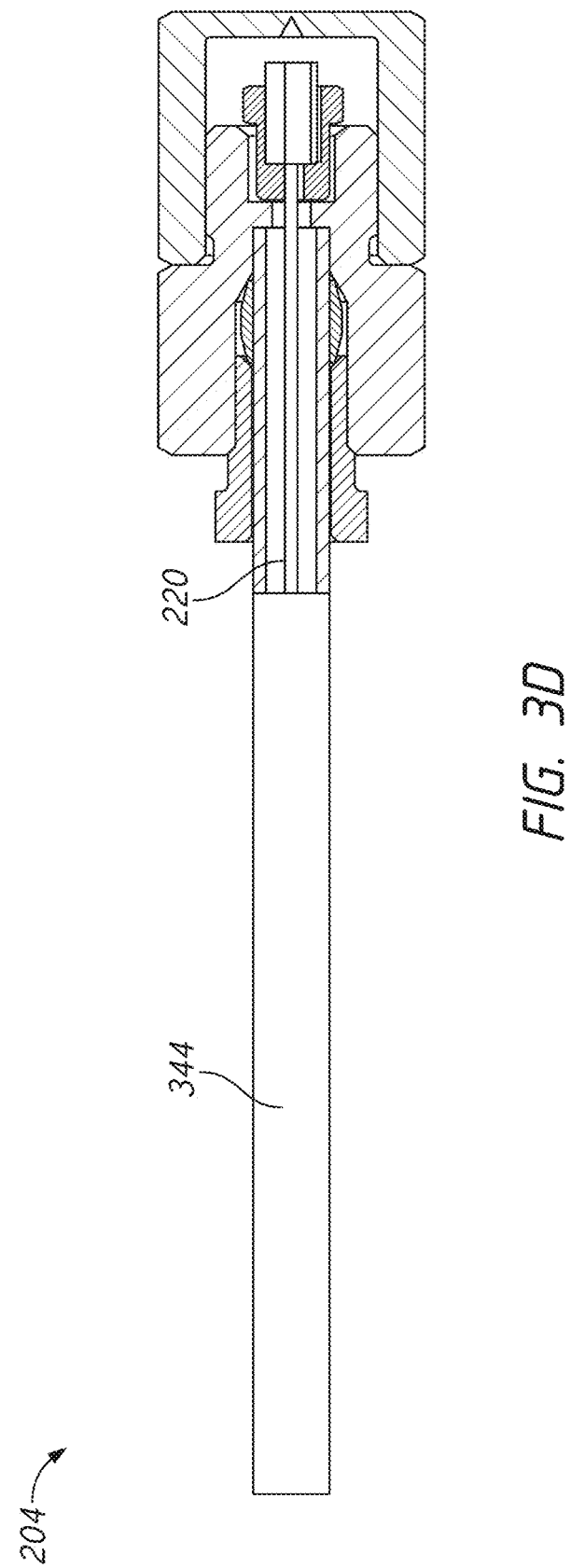
Figure 5:
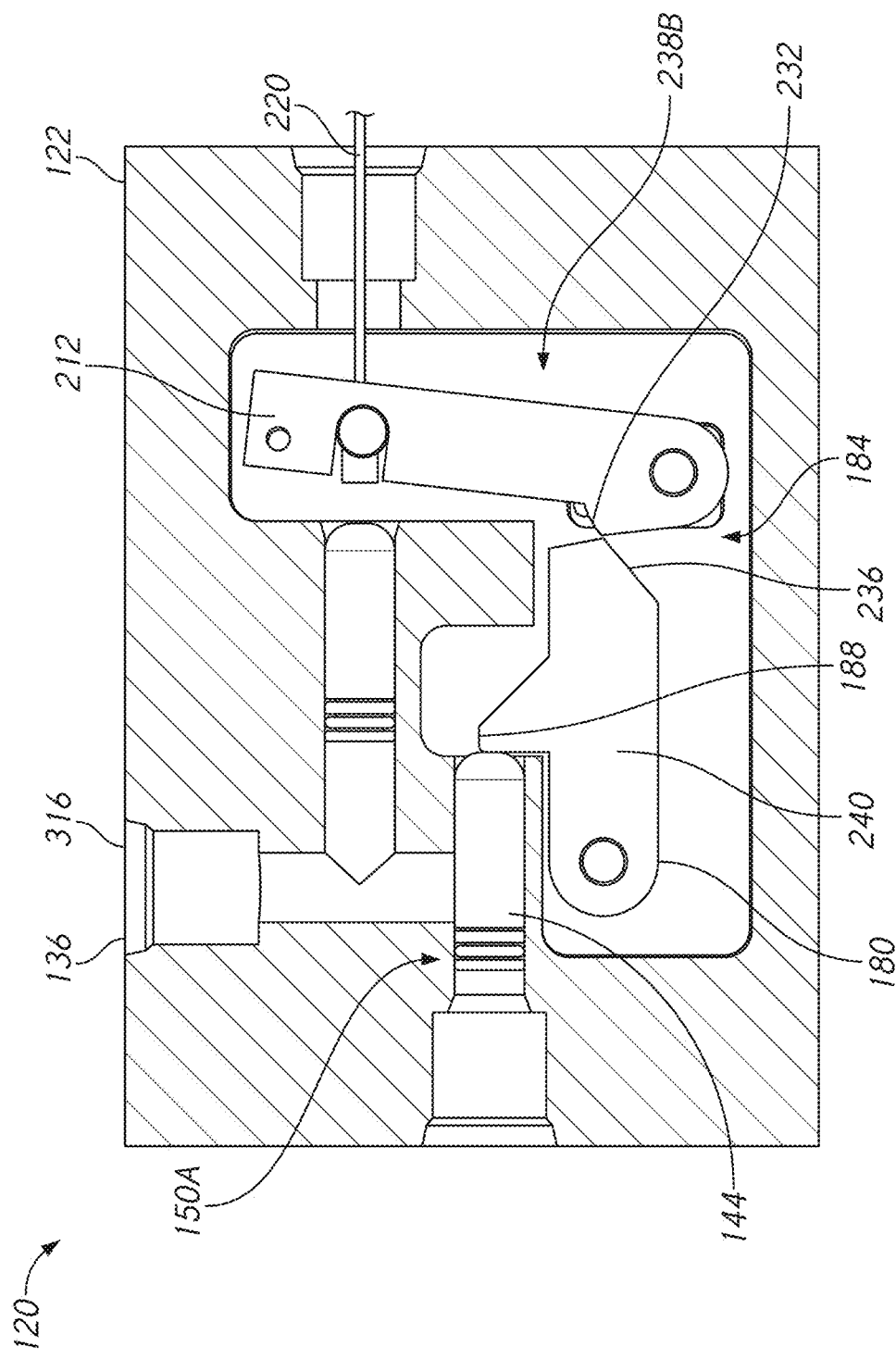
FIG. 5 illustrates the pressure relieve of FIG. 2 showing the latch control member of a trigger assembly in a position that allows a latch to move to a pressure venting configuration.
Figure 6:
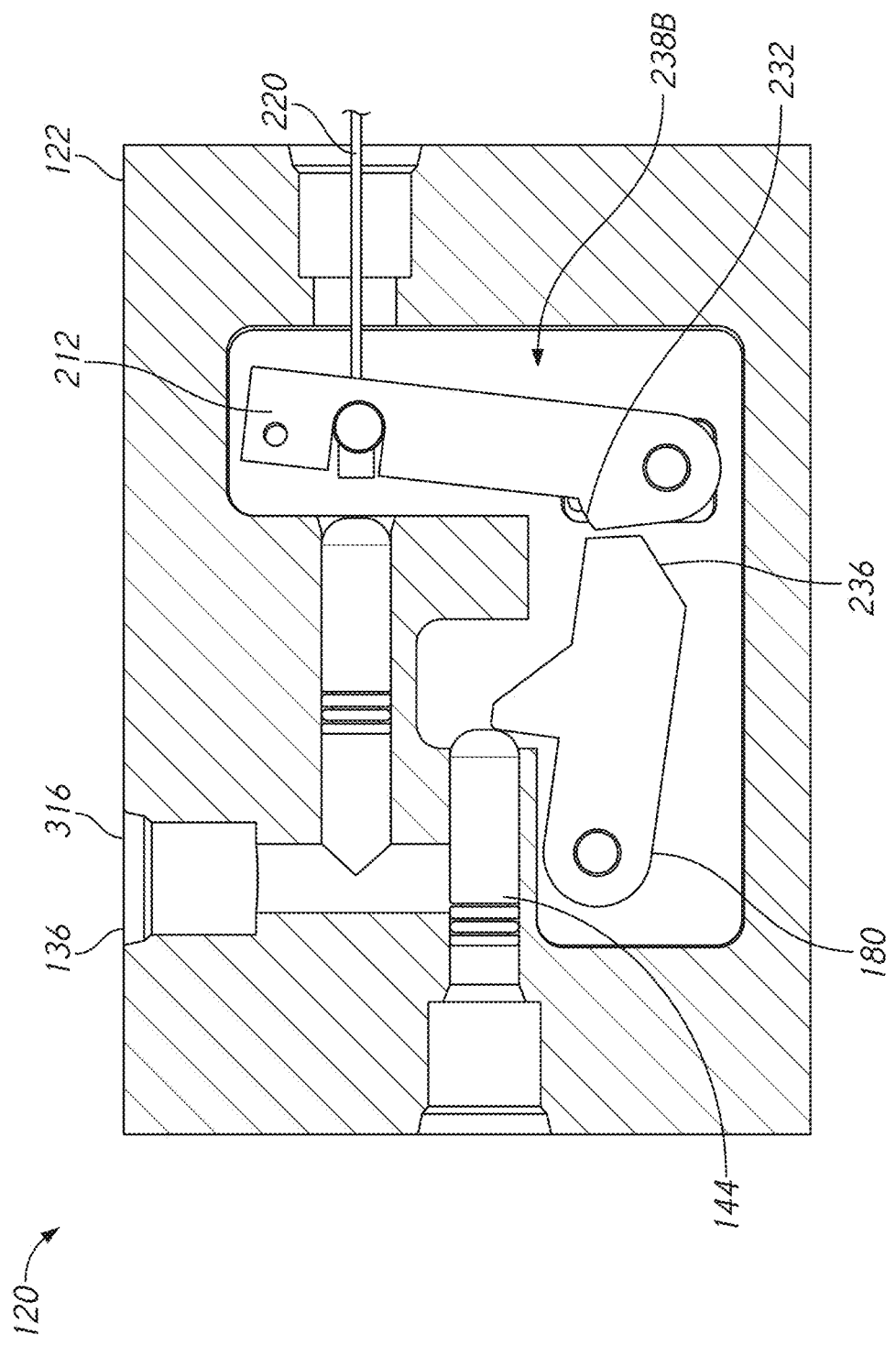
FIG. 6 illustrates the pressure relief device of FIG. 2 showing the latch partially moved from a blocked position in FIG. 5 toward a pressure venting configuration to allow gas to flow through a vent passage.

FIGS. 2 and 3B shows that the pressure relief valve 120 and a pressure relief valve 120' (respectively) can also include a plug 144 that can be disposed in the vent passage 124. The plug 144 can be configured to block flow in the vent passage 124 in conditions where venting is not desired. The plug 144 can include a first portion 148 and a second portion 156. The plug 144 can be a seal end 154 that forms a seal 162 within the vent passage 124. The seal 162 is configured to give way at a trigger pressure, such as a pressure as low as 145 psi or above or as low as 155 psi or above, or a low as 165 psi or above. At lower pressures the seal 162 may be maintained even if the latch 180 is not blocking the plug 144. Also lower pressure levels could be sufficient to move the plug 144 in view of the function of the latch 180 to prevent movement of the plug 144 at such pressures or even at high pressures. The seal end 154 can include an O-ring or other seal forming structure to be placed against the wall 128 to form the seal 162. In some cases an O-ring is partially recessed into a wall of the vent passage 124 and the plug 144 slides over the O-ring. The second portion 156 can include a control end 158 that serves to control the position of the seal end 154 of the plug 144. As will be discussed in greater detail below, the plug 144 is moveable in the vent passage 124 from a first position (as in FIGS. 4-6) in which the seal end 154 blocks flow from the first branch 138 to the second branch 140 to a second position (as in FIG. 7) in which the seal end 154 does not block such flow and an open channel 166 is formed in the vent passage 124.

FIGS. 2 and 3A also shows that the pressure relief valve 120 a pressure relief valve 120' (respectively) can include a latch 180 that is disposed within the body 122. The latch 180 can control the plug 144, e.g., can allow or prevent movement of the plug 144 to the second position (as in FIG. 7). As will be discussed in greater detail below, the latch 180 can have a first configuration 184 in which the latch 180 blocks movement of the plug 144 and a second configuration 192 in which the latch 180 does not block the movement of the plug 144. For example, the latch 180 can be rotatably mounted to the body 122 within a cavity formed therein. The latch 180 can have a first end secured to or rotatable about an axle. The first end of the latch 180 can be secured to or rotatable relative to the axle. The latch 180 can have a second end opposite the first end. The second end of the latch 180 can contact or be controlled by a latch control portion 212. The latch control portion 212 can comprise part of a trigger member, as discussed further below. The latch 180 can have a contact portion 188 disposed thereon. The latch 180 can be elongate, e.g., can include an elongate body 240 disposed between the two ends. The contact portion 188 can project away from a side of the contact portion 188 to a position aligned with the plug 144 when the latch 180 is in the first configuration (e.g., as in FIG. 4). The contact portion 188 can include a first surface disposed transverse to a longitudinal axis of the latch 180. The contact portion 188 can include a second surface disposed at an acute angle to the first surface. The first surface of the contact portion 188 can be configured blocking the movement of the plug 144 in the first configuration. The first surface of the contact portion 188 can be of sufficient length to extend to and in some cases to cross the central longitudinal axis of the plug 144. The interior space of the body 122 can be formed with clearance to allow the latch 180 to move, e.g., to rotate away from the central longitudinal axis of the plug 144 such that the contact portion 188 can rotate out of the position of the first configuration for blocking the plug 144 to the second configuration (e.g., as in FIG. 7) to permit motion of the plug 144, e.g., to allow the plug 144 to slide in the vent passage 124.

FIGS. 2 and 3B shows that the pressure relief valve 120 and the pressure relief valve 120' respectively can include a trigger assembly 200 that is responsive to emergency conditions to open the pressure relief valve 120. The trigger assembly 200 can include a fire detection portion 204 and a latch control portion 212. The fire detection portion 204 can be configured to apply a load 208 (see FIG. 3B) to the latch control portion 212, e.g., to a trigger member. In one embodiment, the fire detection portion 204 includes a elongate body 216. The elongate body 216 can include a tension member. The elongate body 216 can be capable of applying the load 208 to trigger or cause motion of the latch control portion 212 as discussed below. The elongate body 216 can include a shape memory alloy wire in some embodiments. A shape memory wire has an advantage in that it can generate the load 208 without additional mechanisms and thus can provide a simple, low cost and light-weight configuration. The shape memory wire can be configured to be responsive to temperature to change a physical dimension or size thereof. The shape memory wire can be configured to shorten at a temperature above a threshold. Such shortening can result in the load 208 being applied to the latch control portion 212.

The shape memory wire can be housed in a tubular body 344. The tubular body 344 can be flexible in one embodiment. In other embodiments, the tubular body 344 can be rigid and formed with a bend (as discussed below) or another specific geometry. Fittings on the ends of the tubular body 344 can control the motion of one or both ends of the shape memory wire to maximize or maintain a level of the load 208 applied for an extent of shortening. For example, a fitting at a first fixed end 348 of the tubular body 344 can hold the tubular body 344 to the side of the body 122 of the pressure relief valve 120. A fitting at a second fixed end 350 of the tubular body 344 can hold the tubular body 344 in place. The fitting at the second fixed end 350 can suspend the tubular body 344 in place. The fitting at the second fixed end 350 may also secure the end of the elongate body 216, e.g., of a shape memory wire disposed in the tubular body 344. Preferably the elongate body 216 is slideable within the tubular body 344 and in particular within or through the first fixed end 348 of the tubular body 344. In the case of the shape memory wire, as the wire shortens at elevated temperature, the end of the shape memory wire at the second fixed end will be held stationary while the opposite end will be retracted at least partially out of the body 122. Such movement will cause movement, e.g., pivoting, of the latch control portion 212.

In one implementation, the latch control portion 212 is housed within the body 122 of the pressure relief valve 120. The elongate body 216, which can include a shape memory wire, has an end 224 coupled to the latch control portion 212 and a first length 226 disposed in the body 122 and extending from the end 224 to the periphery of the body 122. The shape memory wire 220 has an elongate portion 228 disposed outside the body 122. The elongate portion 228 extends away from the end 224 coupled with the latch control portion 212. The elongate portion 228 is configured to shorten outside the body 122 to apply the load 208 to the latch control portion 212 within the body 122. The load 208 causes the latch control portion 212 to pivot away from the latch 180 as discussed further below. The elongate portion 228 can be a second length of the shape memory wire 220 disposed outside the body 122 of the pressure relief valve 120.

As noted above, the latch control portion 212 of the trigger assembly 200 can be mounted with the body 122. The latch control portion 212 can include a first surface 232. The first surface 232 can be configured to oppose movement of a second surface 236 in one configuration. The second surface 236 can be disposed on the latch 180. The first surface 232 can contact the second surface 236 to block movement of the latch 180 in one configuration (see, e.g., FIG. 4). Contact between the first surface 232 and the second surface 236 can maintain the latch 180 in a first configuration, e.g., one in which the latch 180 block movement of the plug 144 out of a sealing position, preventing venting. When the first surface 232 is spaced away from the second surface 236, the latch control portion 212 allows movement of the latch 180 in a second configuration of the latch 180 (see, e.g., FIGS. 2, 6, and 7)

The trigger assembly 200 provides the latch control portion 212 with a blocking position 238A in which the first surface 232 and the second surface 236 are in contact. The trigger assembly 200 can provide the latch control portion 212 with a non-blocking position 238B. The non-blocking position 238B is provided where the first surface 232 is moved away from the second surface 236, allowing the latch 180 to pivot to the second configuration 192 of the latch 180 (see, e.g., FIG. 7). In the second configuration 192 of the latch 180 the plug 144 can move within or relative to the vent passage 124. As noted above, the latch 180 can include an elongate body 240 pivoted to the body 122 of the pressure relief valve 120. The contact portion 188 can extend from a side surface, e.g., at a central portion 244 of, the elongate body 240. The contact portion 188 can be disposed at a position between opposite ends of the elongate body 240 of the latch 180.

Having described structure of the pressure relief valve 120, the function of the fire detection portion 204 to open the pressure relief valve 120 will now be described. FIG. 2 shows a condition that can benefit from venting. A fire is provided anywhere along the length of the fire detection portion 204. The heat from the fire causes the fire detection portion 204 to respond. For example, the heat from the fire can cause the elongate body 216, e.g., a shape memory wire, to shorten. As the shape memory wire shortens, the load 208 is applied to the latch control portion 212 causing it to rotate from a first, blocking position (e.g., a vertical orientation, as in FIG. 4) to a second position (e.g., angled to vertical, as in FIGS. 2, and 5-7). In the second position, the first surface 232 of the latch control portion 212 is out of contact with the second surface 236 of the latch 180. The first surface 232 can even be rotated away from the second surface 236. The latch 180 can thus be allowed to rotate from the first configuration 184 to the second configuration 192. The first configuration 184 provides the contact portion 188 of the latch 180 in the blocking position, preventing movement of the plug 144 by contacting the second portion 156 thereof. The second configuration 192 provides that the latch 180 has moved, e.g., rotated, such that the contact portion 188 is not in a position, e.g., is rotated away from the second portion 156 of the plug 144.

When the latch 180 rotates fully to the second configuration 192, the contact portion 188 is out of the way of the control end 158 of the plug 144. As such the plug 144 can move within or relative to the vent passage 124. In particular, the plug 144 can slide along the wall 128 of the vent passage 124 in response to pressure in from the tank 104.

Figure 7:
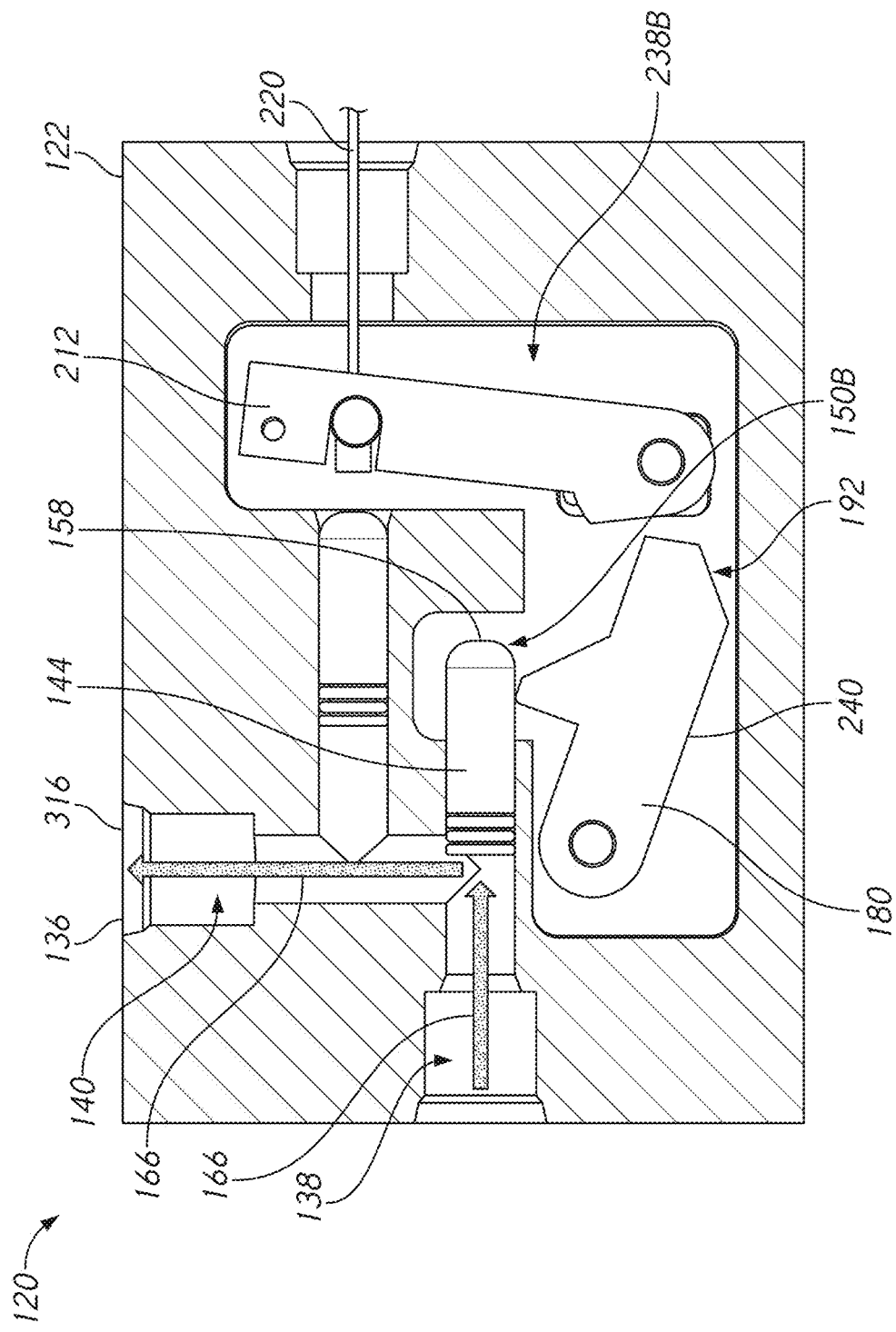
FIG. 7 illustrates the pressure relief device of FIG. 2 showing the latched moved to a position permitting movement of a plug and the plug moved to a position where the plug allows for venting of gas through the vent passage.

Such movement can cause the first branch 138 and the second branch 140 to be in fluid communication so that the contents of the tank 104 can flow through the vent passage 124 to the atmosphere (see, e.g., FIG. 7).

Figure 8:
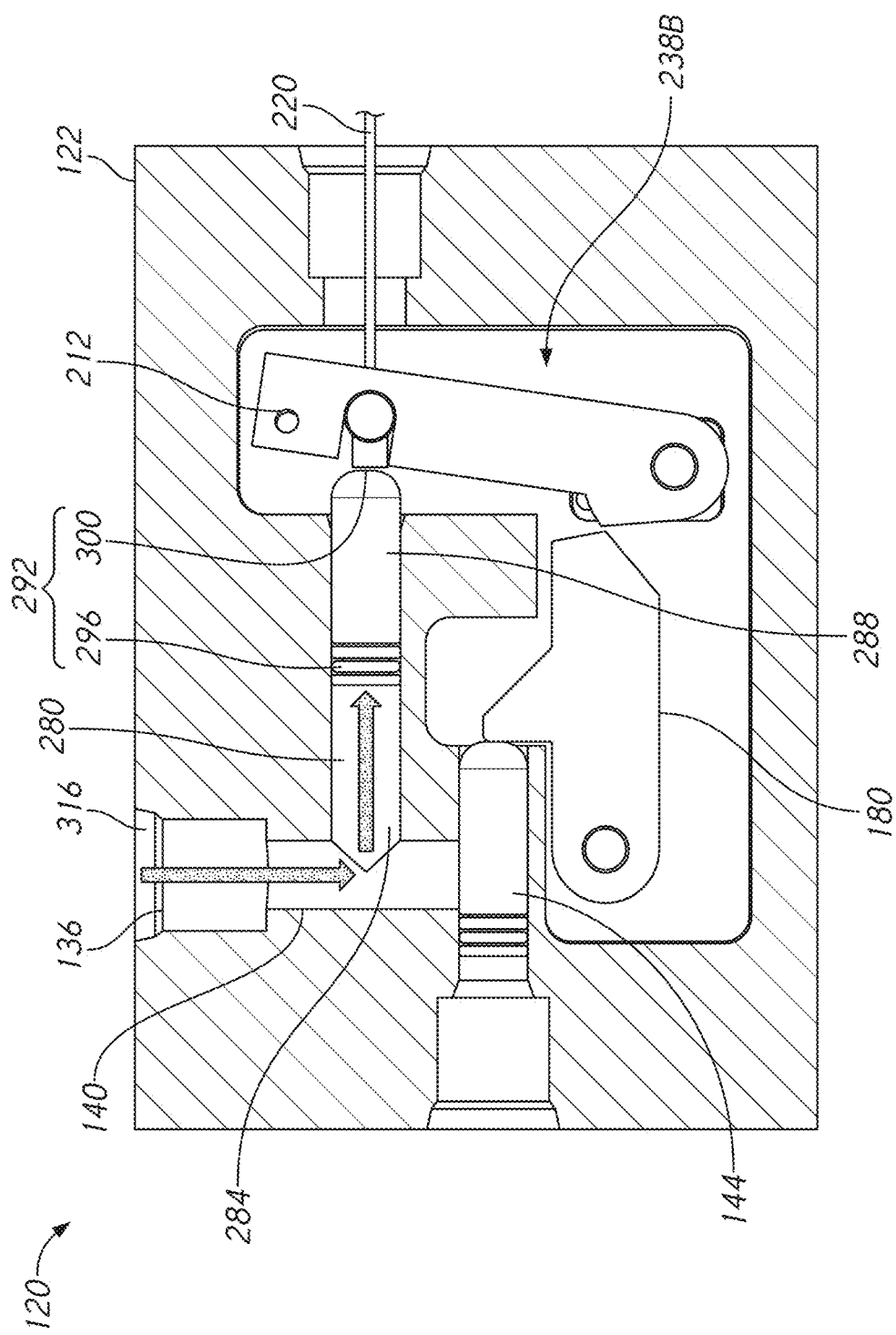
FIG. 8 illustrates the pressure relieve of FIG. 2 showing introduction of pressurized gas into a trigger actuation passage to cause a trigger piston to move the latch control member to allow the latch to move toward a venting configuration.

While the pressure relief valve 120 can adequately respond to the detection of a fire by the fire detection portion 204, in some case it is desirable to provide for moving the latch control portion 212 through another mechanism. FIG. 8 shows that in some embodiments a trigger actuation passage 280 is provided within the body 122. The trigger actuation passage 280 can extend between a first end 284 and a second end 288. The first end 284 can extend from a periphery of the body 122 (see FIG. 3A) or can be extend from a portion of the second branch 140 of the vent passage 124 (see FIG. 8). The second end 288 can be disposed adjacent to the latch control portion 212. The pressure relief valve 120 can include a trigger piston 292 disposed in the trigger actuation passage 280. The trigger piston 292 can have a first end 296 slideably mounted in the trigger actuation passage 280. The trigger piston 292 can form a seal with a wall of the trigger actuation passage 280, e.g., with one or more O-rings. The first end 296 can be an upstream end of the trigger piston 292.

The trigger piston 292 can include a second end 300 being adjacent to or contacting the latch control portion 212 of the fire detection portion 204 in a first position 304 of the trigger piston 292. The second end 300 can be a triggering end of the trigger piston 292. The first end 284 can be an inlet end 312 disposed at a periphery of the body 122 (as in FIG. 3A) or in fluid communication with the second end of the vent passage 124 of the pressure relief valve 120 (as in FIG. 8). The first end 284 can be in fluid communication with a source of pressurized gas distinct from a tank. In one case, the inlet end 316 is in fluid communication with a second tank 104B while the first branch 138 of the vent passage 124 is in fluid communication with a first tank 104A. The tank 104B can be a tank with an internal volume configured to be pressurized with a gas and an orifice configured to permit gas to flow out of and/or into the internal volume. Pressure can build in the trigger actuation passage 280 to cause the trigger piston 292 to shift therein. As the trigger piston 292 moves toward the latch control portion 212, the trigger piston 292 can cause the latch control portion 212 to rotate to the non-blocking position 238B. The non-blocking position 238B is one that permits the latch 180 to rotate to allow the plug 144 to move in the vent passage 124 to allow for venting in the vent passage 124.

Figure 4:
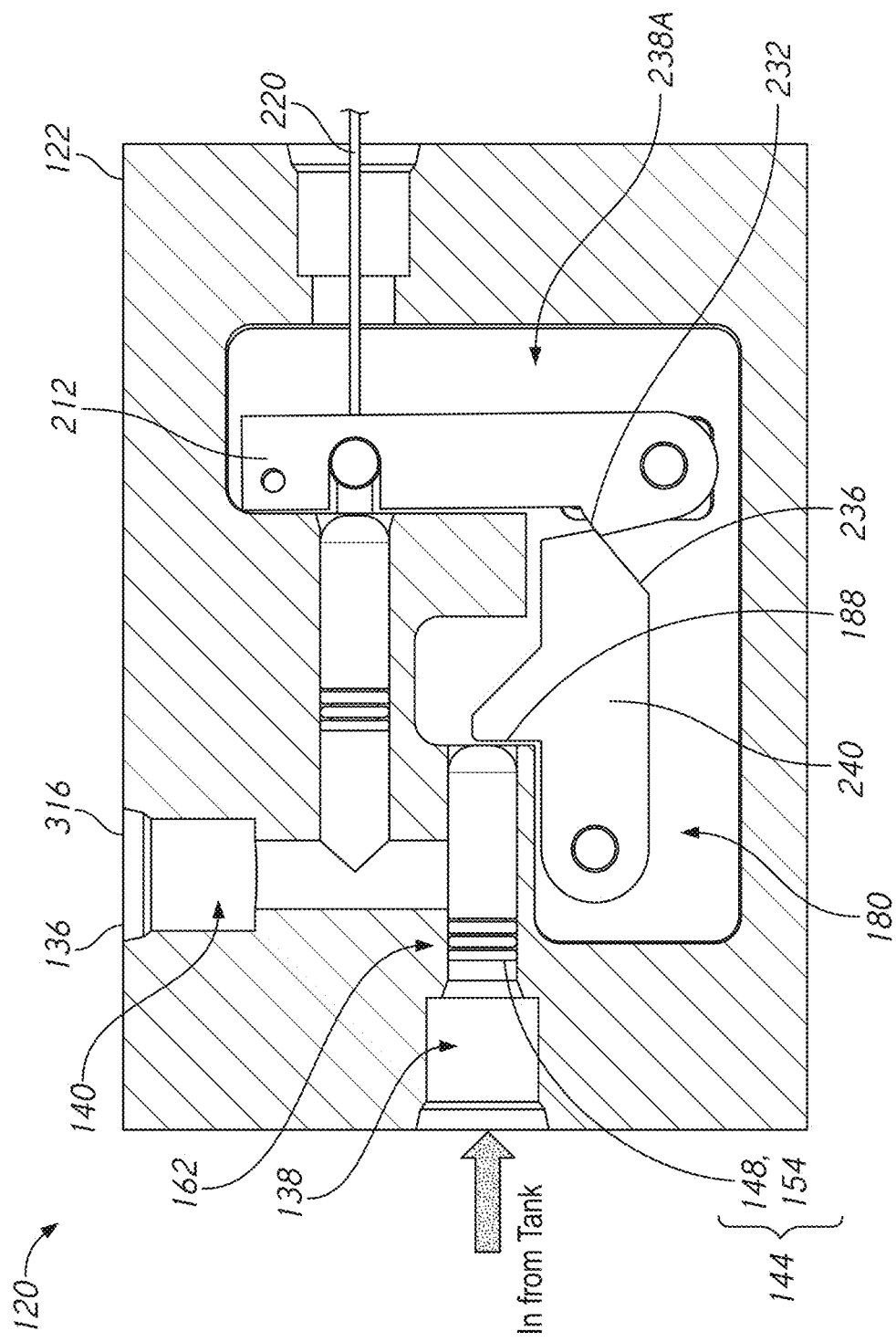
FIG. 4 illustrates a pressure relief valve shown in FIG. 2 with a latch control member in a pressure containment configuration.
Figure 9:
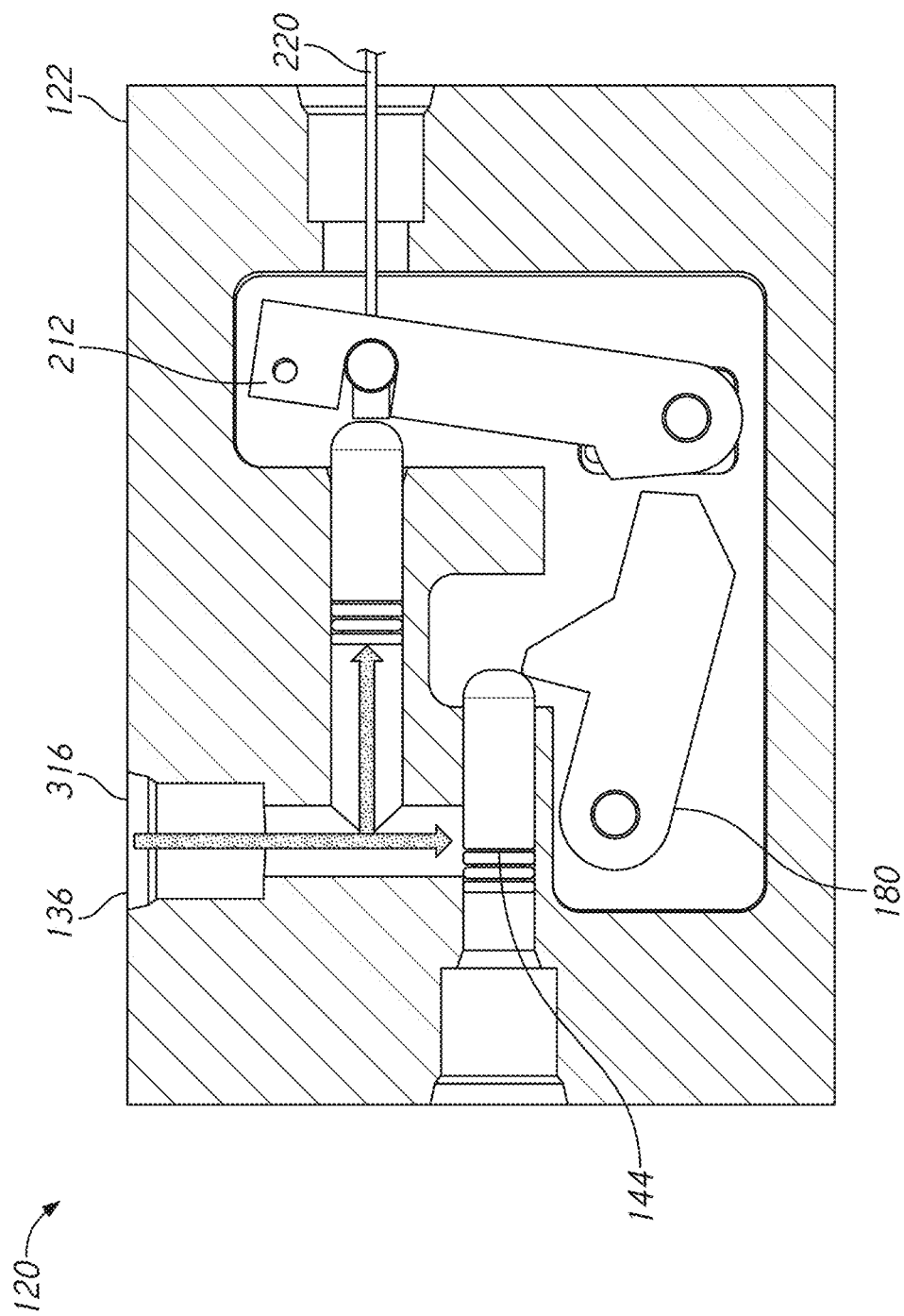
FIG. 9 illustrates the pressure relief device of FIG. 2 showing the latch moved from a blocking position to a disposed away position to allow the plug to move to open the vent passage.

The sequence of venting by actuating the trigger piston 292 can be understood in connection with FIGS. 4, 8, and 9. In FIG. 4 the pressure relief valve 120 is in a pressure containing (non-venting) configuration in which the plug 144 prevents any flow of gas from a tank with which the pressure relief valve 120 is coupled. While gas may be present in the upstream end of the first branch 138 of the vent passage 124, the plug 144 is positioned such that the seal end 154 form a seal 162 with the wall 128 of the vent passage 124. Movement of the plug 144 along the first branch 138 is blocked by the contact portion 188 of the latch 180. The latch 180 is prevented from rotating away from the position of FIG. 4 by the latch control portion 212. In particular, the first surface 232 of the latch control portion 212 contacts the second surface 236 of the latch 180 to prevent rotation of the latch 180.

Figure 10:
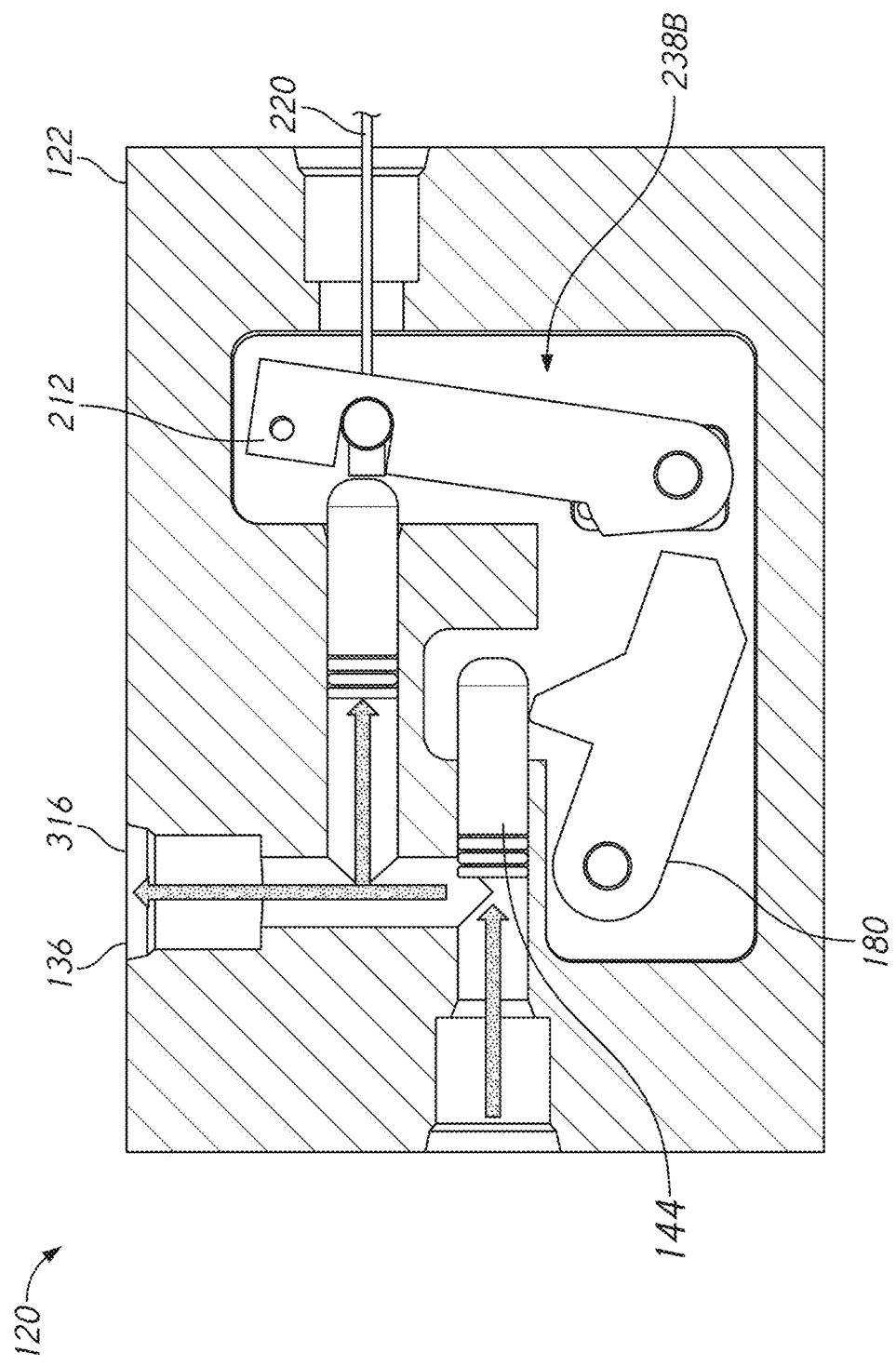
FIG. 10 illustrates the pressure relief device of FIG. 2 showing the plug moved from the blocked position of FIG. 8 to a venting position, allowing gas to flow through a vent passage.

FIG. 8 shows back pressure building in the second branch 140 of the vent passage 124. The pressure in the second branch 140 communicates to and increases the pressure in the trigger actuation passage 280. The pressure can eventually cause the trigger piston 292 to shift until the second end 300 thereof pushes the latch control portion 212. The latch control portion 212 is pivotably mounted to the body 122 and as such is rotated by a load applied by the second end 300 of the trigger piston 292. The latch control portion 212 can be rotated to the non-blocking position 238B seen in FIG. 8. Such rotations moves the first surface 232 of the latch control portion 212 of the trigger assembly 200 out of contact with the second surface 236 of the latch 180. With the contact portion 188 of the latch 180 out of a blocking position, as in FIG. 7, pressure in the first branch 138 of the vent passage 124 can cause the plug 144 to move as in FIG. 9. In this position the contact portion 188 is not contacting the control end 158 of the plug 144. This allows the plug 144 to shift within the first branch 138 of the vent passage 124 such that the seal 162 is not formed between the first branch 138 and the second branch 140, as can be seen in FIG. 10. The absence of the seal 162 between the first branch 138 and the second branch 140 enables gas from the tank 104 to flow out to the atmosphere.

FIGS. 11A-11G illustrate a gas containment system 100A that includes a plurality of fuel tank. The gas containment system 100A shows how the pressure relief valve 120 can combine action of the fire detection portion 204 and the trigger piston 292 to vent more than one tank in the gas containment system 100A.

The gas containment system 100A includes a tank 104A, a tank 104B and a tank 104C. The tanks 104A, 104*b*, 104*c* each supply gas to a fuel management module FMM and a combustion engine CE along a fuel supply line 400. A manifold or valve system can be provided to select fuel from any of the tanks or combine the fuel flow from the tanks to supply the combustion engine CE. An output passage of the tank 104A can be placed in fluid communication with a corresponding pressure relief valve 120A via a relief valve inlet passage 412A. An output passage of the tank 104B can be placed in fluid communication with a corresponding pressure relief valve 120B via a relief valve inlet passage 412B. An output passage of the tank 104C can be placed in fluid communication with a corresponding pressure relief valve 120C via a relief valve inlet passage 412C. A second end 136 of the vent passage 124 of the pressure relief valve 120A can be placed in fluid communication with a vent line 404A. A second end 136 of the vent passage 124 of the pressure relief valve 120B can be placed in fluid communication with a vent line 404B. A second end 136 of the vent passage 124 of the pressure relief valve 120C can be placed in fluid communication with a vent line 404C. A vent connection conduit 408 can provide for fluid communication between the second end 136 of each of the pressure relief valves 120A, 120B, 120C.

As such, pressure in the vent line 404A can be communicated from the second end 136 of the vent passage 124 of the pressure relief valve 120A to the second branch 140 of the vent passage 124 of the pressure relief valve 120B or the second branch 140 of the vent passage 124 of the pressure relief valve 120C. Further, the pressure relief valve 120A can have a fire detection portion 204A similar to the fire detection portion 204 discussed above. The pressure relief valve 120B can have a fire detection portion 204B. The pressure relief valve 120C can have a fire detection portion 204C. One or more or all of the 204A, 204B, 204C can be similar to the fire detection portion 204 discussed above.

Figure 11A:
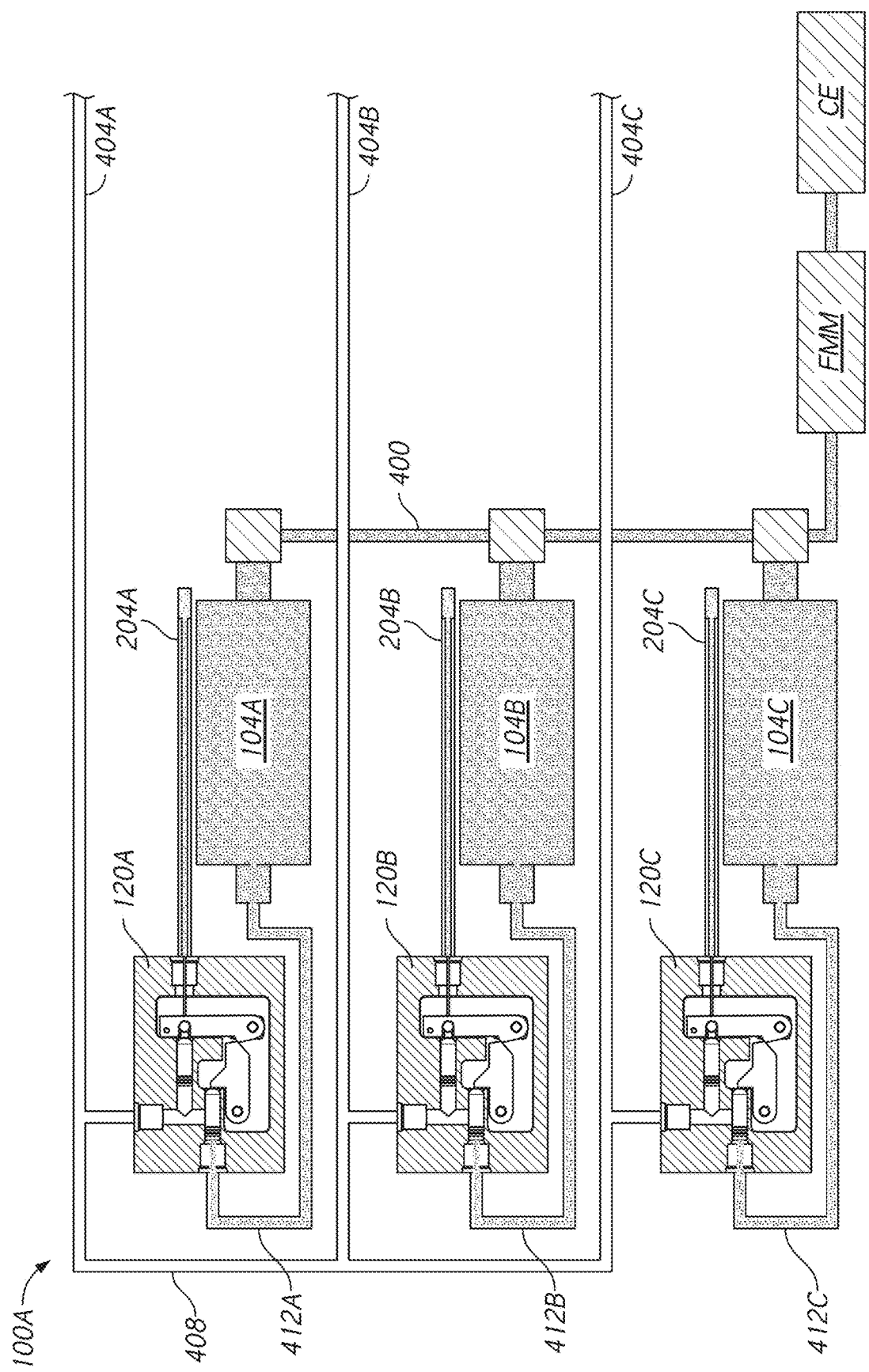
FIG. 11A shows a gas containment system for a vehicle fuel system including three fuel tanks, each of the tanks having a pressure relief valve in a closed configuration.
Figure 11B:
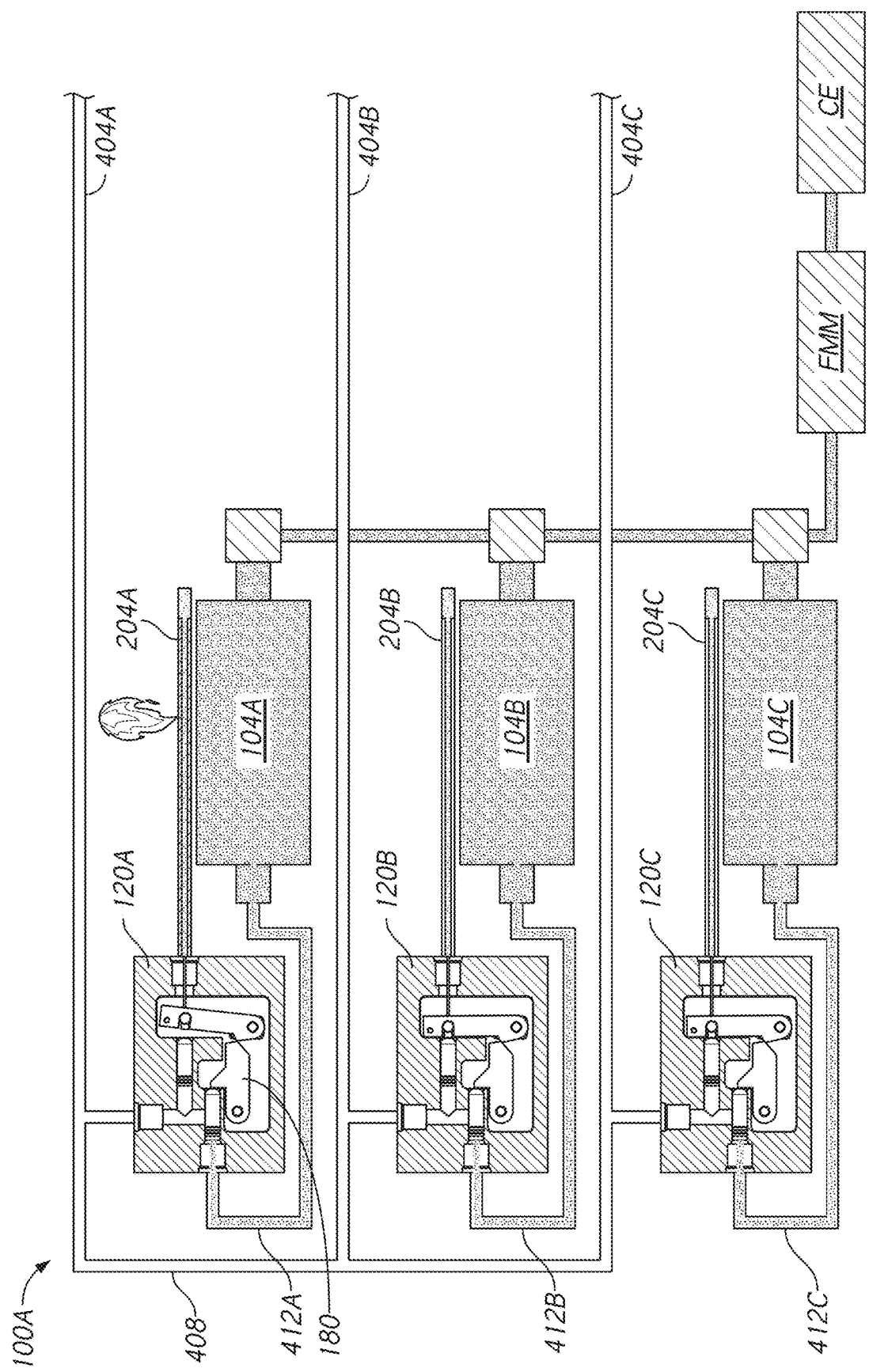
FIG. 11B shows the system of FIG. 11A with a first pressure relief valve coupled with a first tank detecting a fire along a fire detection portion of a trigger assembly thereof.
Figure 11C:
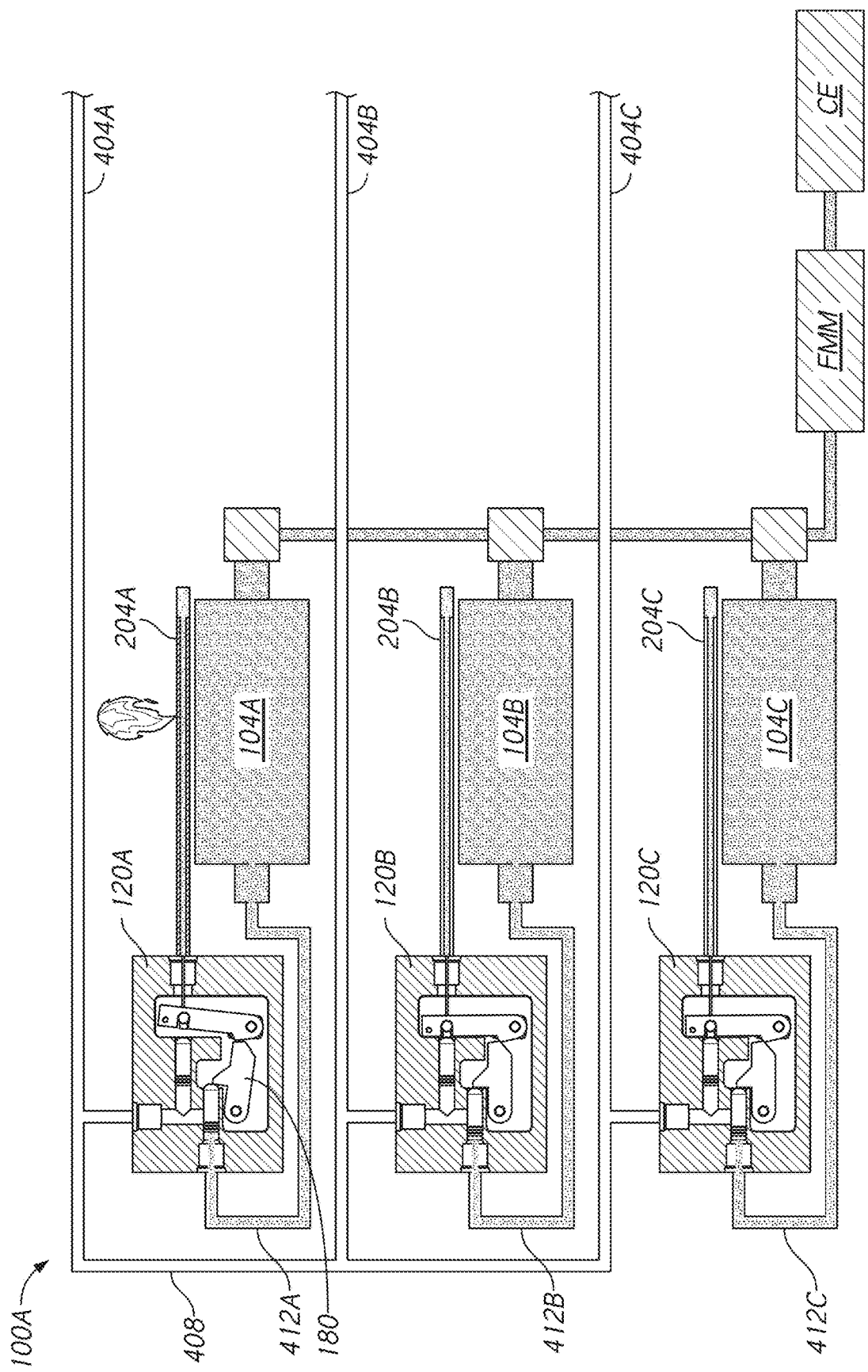
FIG. 11C shows the system of FIG. 11A with the fire detection portion moving a latch member to allow a latch of the first pressure relief valve to move away from a blocking position.
Figure 11D:
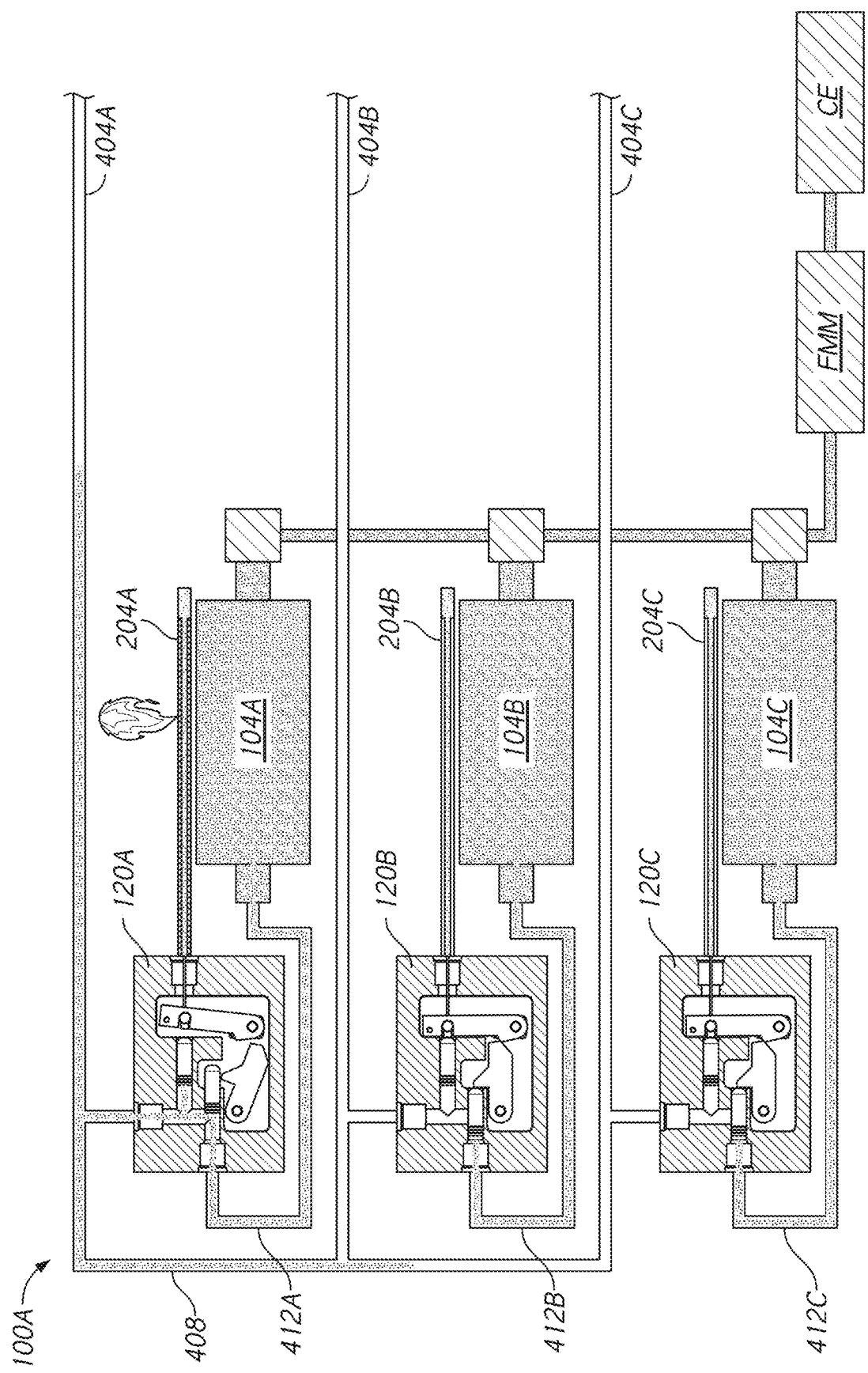
FIG. 11D shows the system of FIG. 11A with the plug having moved from a seal position to a second position spaced from the seal position, the second position allowing gas to flow out of the first tank and into fluid communication with a vent line associated with each of a second and a third tank.

FIG. 11B illustrates a situation in which a fire or other heat event arises adjacent to the fire detection portion 204A associated with the pressure relief valve 120A and the tank 104A. The fire detection portion 204A can operate in the same manner as the fire detection portion 204 discussed above to cause the pressure relief valve 120 to open. For example, the pressure relief valve 120A can include a trigger assembly 200 that cause a load 208 to move the latch control portion 212 thereof, which allows a latch 180 to move out of a blocking position to allow for shifting of a plug 144. The shifting of the plug 144 allows the first branch 138 and the second branch 140 to be in fluid communication so that pressurized gas can escape from the tank 104A into the vent line 404A. This is seen by comparing the position of the latch 180 in FIGS. 11B, 11C, and 11D. As gas vents from the tank 104A, some flows out of the vent line 404A into the atmosphere as illustrated in FIG. 11D. Some of the gas flows in the vent connection conduit 408 to the vent line 404B and to the vent line 404C.

Figure 11E:
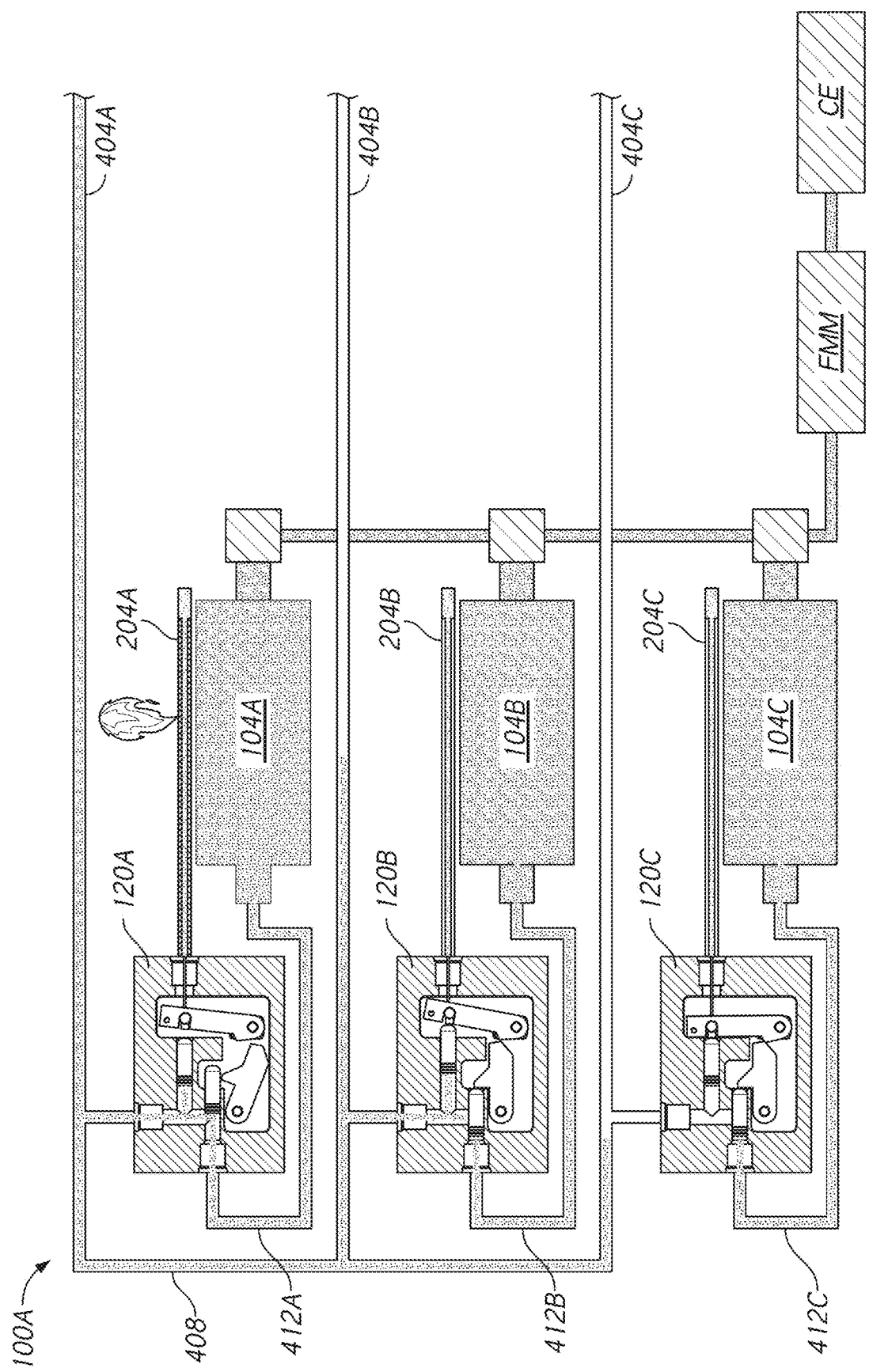
FIG. 11E shows the system of FIG. 11A with pressurized gas from the first pressure relief valve entering a second pressure relief valve to move a trigger piston of the second pressure relief valve.
Figure 11F:
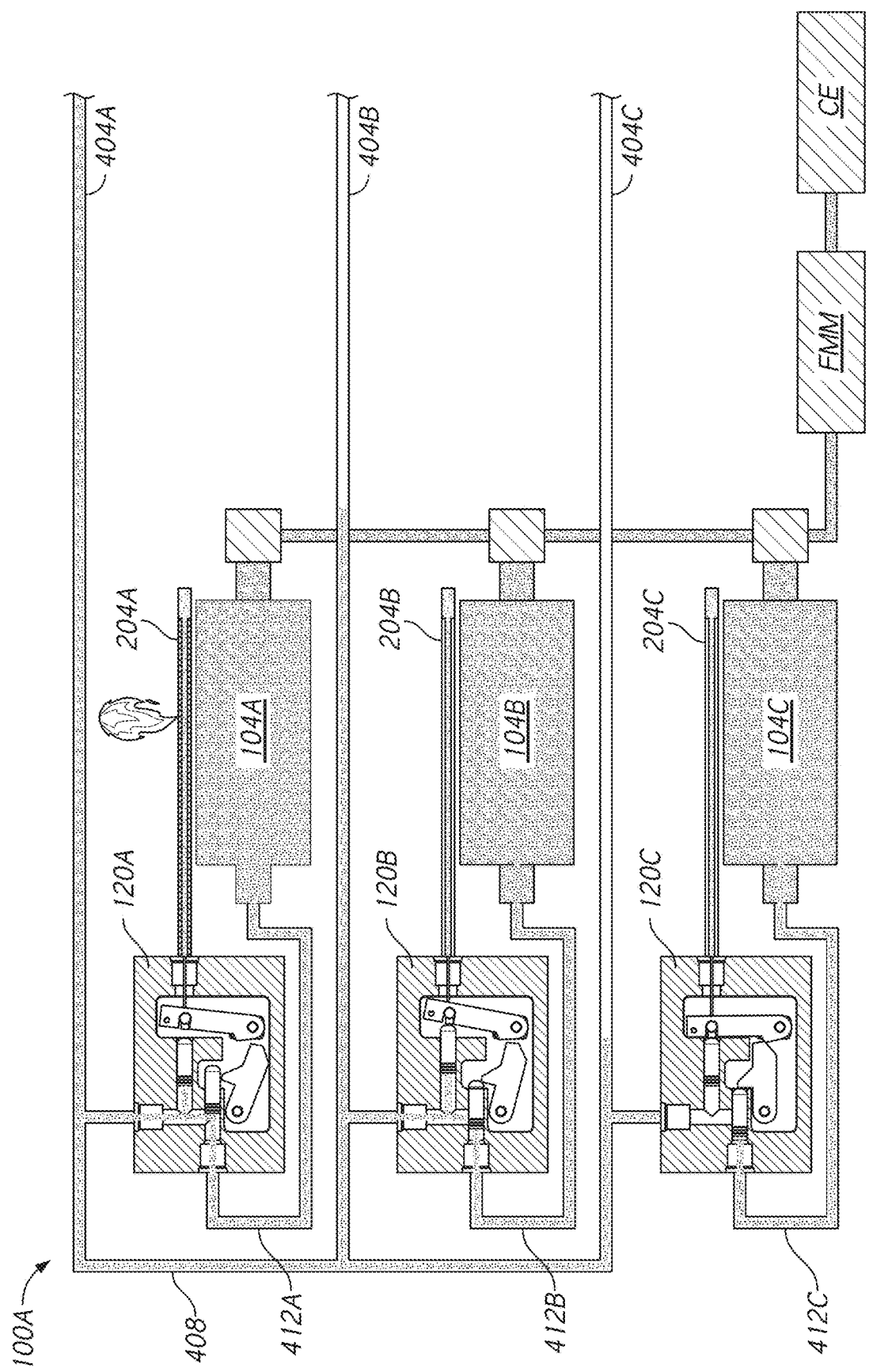
FIG. 11F shows the system of FIG. 11A with a latch control member of the second pressure relief device moved to allow a latch to move away from a blocking configuration to allow a plug to move within the second pressure relief valve.
Figure 11G:
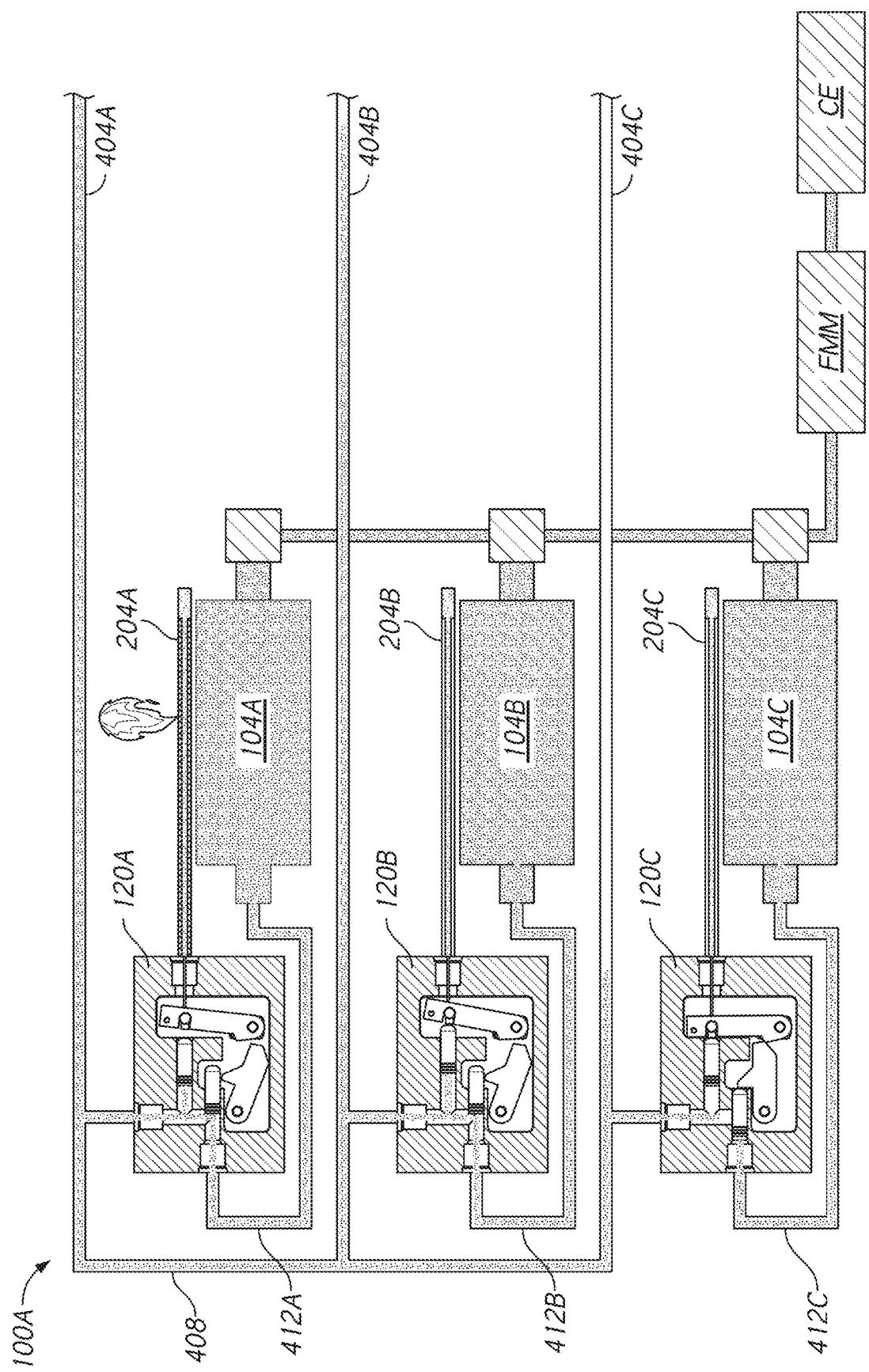
FIG. 11G shows the system of FIG. 11A with a plug in a vent passage of the second pressure relief device moved from a seal position to a second position spaced form the seal position, the second position allowing gas to flow out of the second tank into a second vent line.

FIG. 11E shows that gas flowing in the vent line 404B flows into the second branch 140 of the pressure relief valve 120B. Gas in the second branch 140 of the pressure relief valve 120B flows into the trigger actuation passage 280 causing the trigger piston 292 of the pressure relief valve 120B to shift into contact with and thereafter to move the latch control portion 212 thereof. FIG. 11F shows that the movement of the latch control portion 212 allows the latch 180 of the pressure relief valve 120B to rotate out of a position blocking movement of the plug 144 of the pressure relief valve 120B. This allows the plug 144 of the pressure relief valve 120B to move such that the seal 162 is not provided between the first branch 138 and the second branch 140 of the pressure relief valve 120B. As a result, the gas in the tank 104B is allowed to flow from the first branch 138 to the second branch 140 of the pressure relief valve 120B. Some of this gas can flow through the vent line 404B to the atmosphere. Some of the venting gas can flow in the vent connection conduit 408 to the second end 136 of the vent passage 124 of the pressure relief valve 120C. This can cause pressure in the trigger actuation passage 280 to build sufficiently to shift the trigger piston 292 of the pressure relief valve 120C into engagement with the latch control portion 212 thereof to move the latch control portion 212 to allow the plug 144 to move relative to the vent passage 124. As the plug 144 of the pressure relief valve 120C moves within or relative to the vent passage 124 thereof, the seal 162 is not disposed between the first branch 138 and the second branch 140 of the vent passage 124. As a result, the gas in the tank 104C can be vented from the pressure relief valve 120C, as seen in FIG. 11G.

In the scenario illustrated in FIGS. 11A-11G a fire is detected by the fire detection portion 204A of the gas containment system 100A. The fire may be undetectable by the fire detection portion 204B of the pressure relief valve 120B and the fire detection portion 204C of the pressure relief valve 120C. As a result, the fire detection portion 204A is able to expedite venting in an emergency in a way that reduces the risk that the fire will quickly spread to the tanks 104B, 104C (or other tanks if more than three tanks are provided). This secondary venting trigger, sometimes referred to herein as sympathetic venting, thus can reduce a delay in response of the gas containment system 100A to a fire or similar emergency situation. As a result, the tanks 104A, 104B, 104C can be vented in rapid succession even if only one of the fire detection portion 204A, 204B, 204C is able to detect a fire.

Although the gas containment system 100 and the gas containment system 100A provide advantages in including multiple trigger modes, in variations only one trigger mode is provided. For example, the fire detection portions 204 can be provided and operate such that the venting of the tanks 104 can be independent. Each tank can vent to a vent line 404 without the vent lines being fluidly connected, e.g., by a vent connection conduit 408. This can provide a simpler system and may be sufficiently responsive if the tanks are very close together such that the fire detection portions 204 would each operate similarly from a fire or other emergency event anywhere around the gas containment system 100A. In some cases it is preferred to only vent one tank of a system when only that tank is at risk. In such case it is preferred to minimize or eliminate sympathetic venting.

Figure 12A:
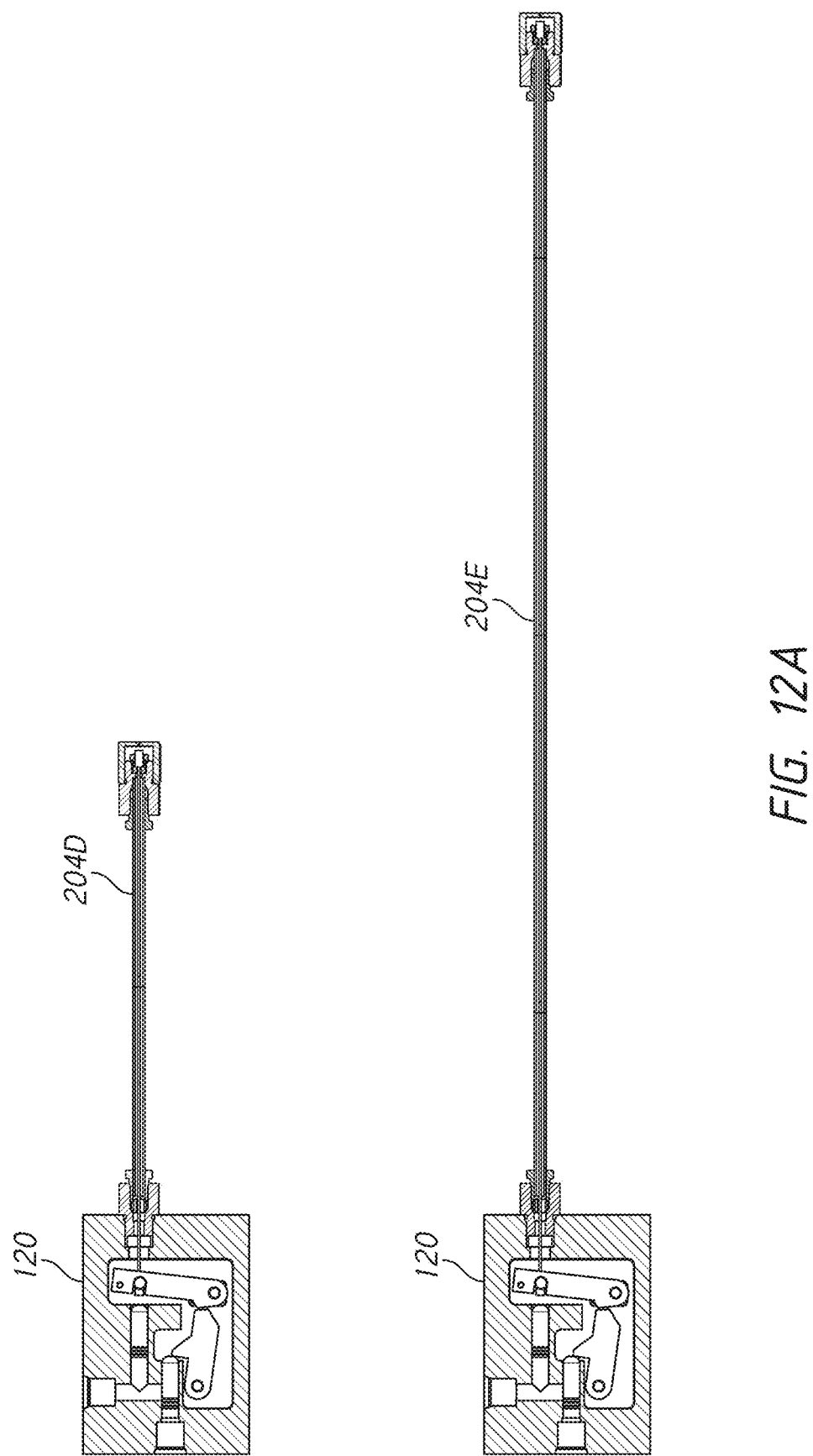
FIG. 12A shows two embodiments of a pressure relief valve with different trigger assemblies configured to detect fire over a smaller and a larger field.

In another case the use of fire detection portion 204 as described herein is not provided. The gas containment system 100 or the gas containment system 100A could be modified so that the pressure relief valves 120 are each triggered by the trigger piston 292, e.g., by pressurizing the trigger actuation passage 280. The pressure in the trigger actuation passage 280 can come from any source, including another tank that has been vented by any sort of valve, including a manual valve FIGS. 12A-12E illustrate additional embodiments of venting components and systems. For example, FIG. 12A shows a system in which a pressure relief valve 120 and a fire detection portion 204D or a fire detection portion 204E are provided. The fire detection portion 204D is a relatively short and straight configuration. The fire detection portion 204D can be useful for applications such as for shorter tanks, e.g., tanks having a length of around 60 inches or less. In such embodiments, the length of a straight portion of the fire detection portion 204D can be in a range of 30-120 inches (76-305 cm), a range of 40-110 inches (101-279 cm), or a range of 50-100 inches (127-254 cm). The fire detection portion 204E is a relatively long and straight configuration. The fire detection portion 204E can be useful for applications such as for tanks having a straight portion of around 150 inches in length (381 cm). The length of a straight segment of the fire detection portion 204E can be from around 100 inches (254 cm) to around 150 inches (381 cm). In such embodiments, the length of the fire detection portion 204E can be up to 20 feet (610 cm) or more such that it can be wound or folded around one or multiple tanks.

Figure 12B:
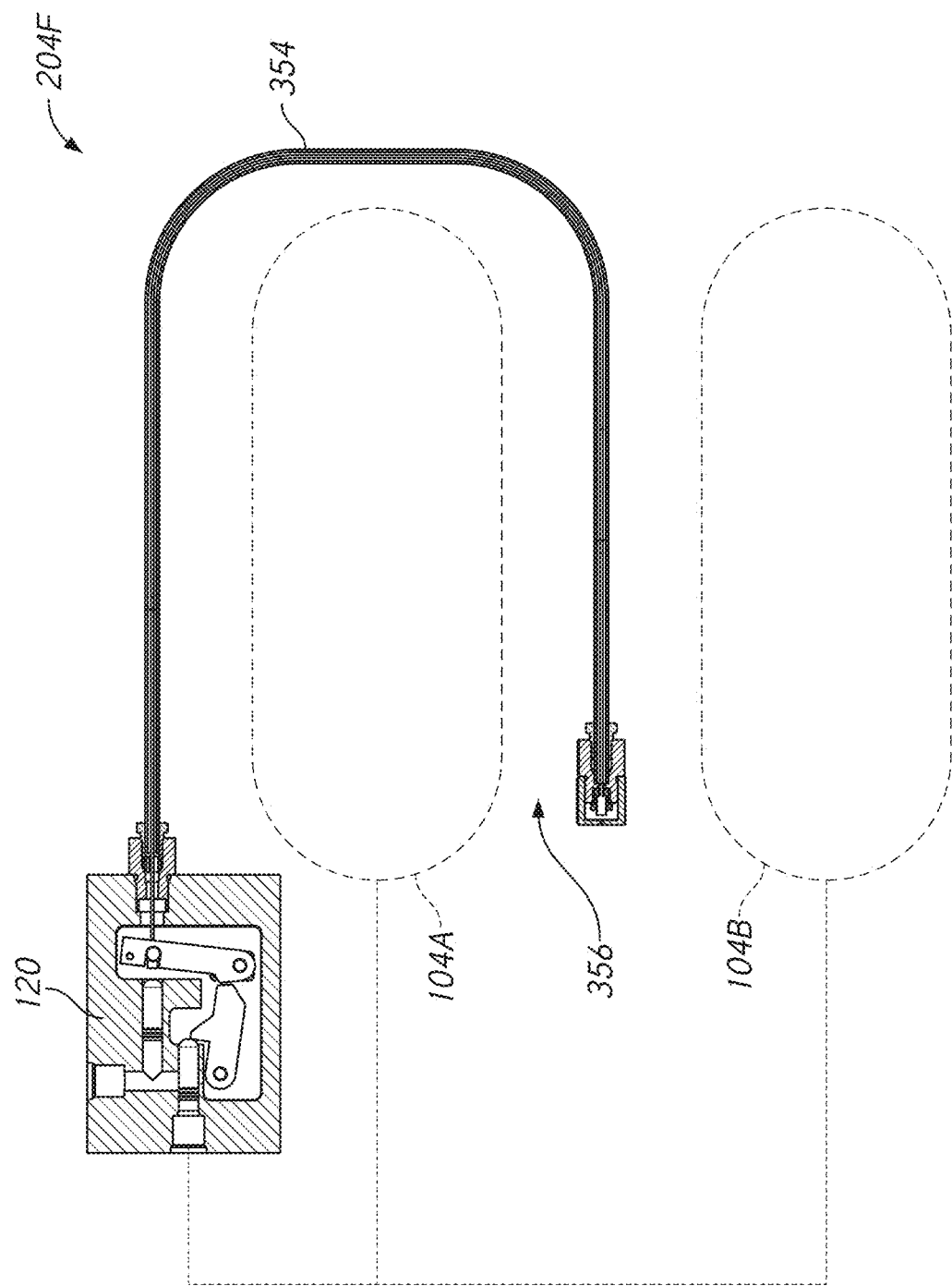
FIG. 12B shows a pressure relief valve with a trigger assembly configured to detect fire in or around one or two of two adjacent gas storage cylinders.

FIG. 12B illustrates another embodiment in which a pressure relief valve 120 and a fire detection portion 204F are provided. The fire detection portion 204F can be seen to be shaped, e.g., to have a bend 354 or a bight forming an inner concave area. An example can provide an inner portion 356 of the bend 354 that extends around tank 104A to be disposed about the tank 104A and adjacent to the tank 104B. The inner concave area can be sized to receive the tank 104A. As such the fire detection portion 204F can reach around an end of the tank 104A to be able to sense emergency events, like heat or fire on a top and bottom side or on a front and a back side, as examples. The fire detection portion 204F can be long enough and shaped to expose a length thereof, e.g., a length of a shape memory wire 220 to more than one tank. The venting of the tank 104B can trigger sympathetic venting of the tank 104A. Many other possible configurations can be provided.

Figure 12C:
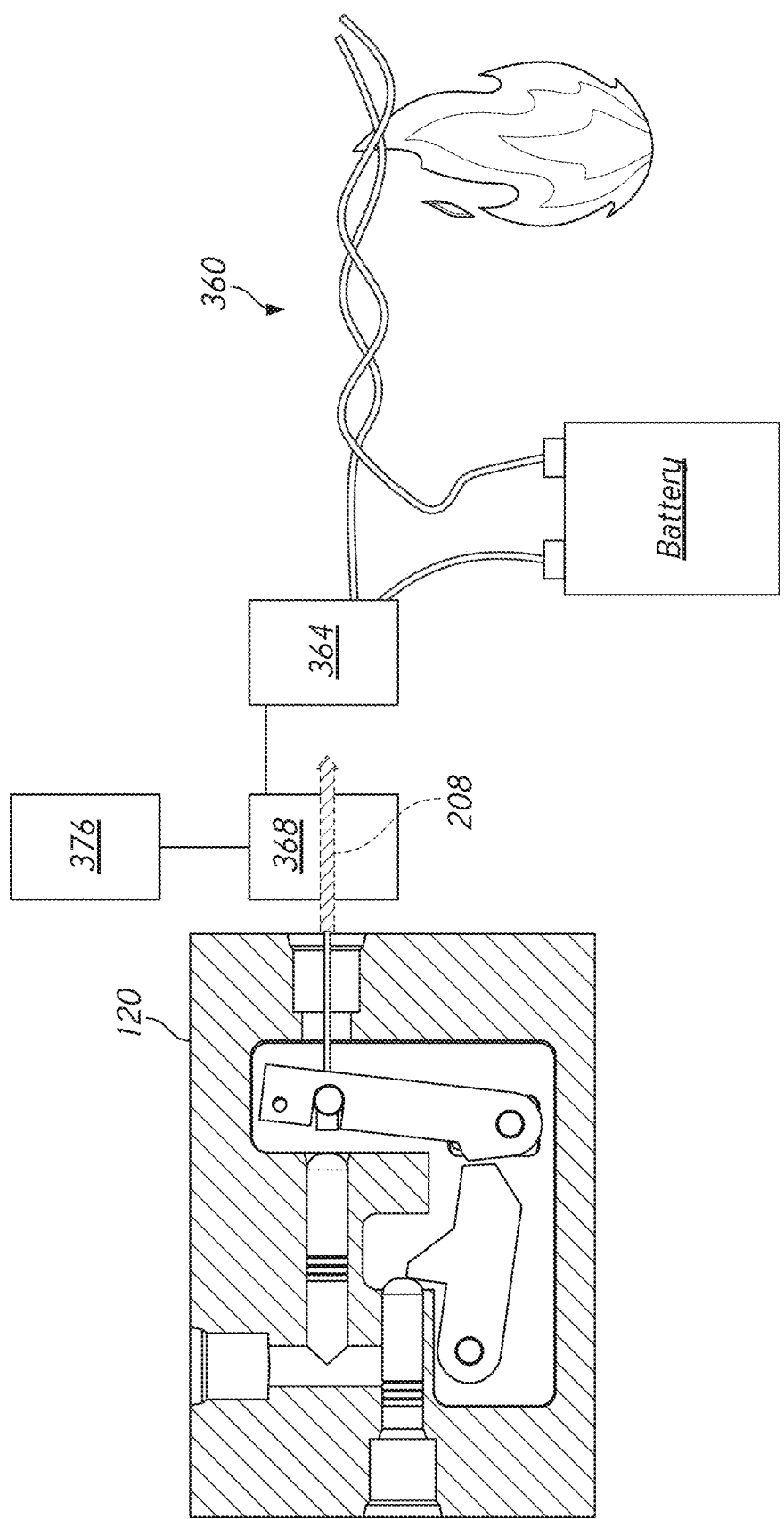
FIG. 12C shows a pressure relief valve with a trigger assembly having a linear heat detector configured to detect a fire or other thermal event and to engage a solenoid to apply a load to cause a pressure relief valve to vent gas.

FIG. 12C illustrates another configuration in which a variation of the fire detection portion 204 does not rely on a shape memory allow to trigger venting. For example, the load 208 can be provided by another device apart from the shape memory wire 220. In one example, a linear heat detector 360 is provided that is coupled to a current source. The current source can include a battery as an example. In one case, the linear heat detector 360 is coupled with a processor 364. The processor 364 enables an analysis of current flowing in the linear heat detector 360 that enables confirmation of a heat event, e.g., fire, where venting is called for.

FIG. 12C illustrates that a solenoid 368 can be used in combination with the pressure relief valve 120. The solenoid 368 is coupled with the processor 364. The processor 364 can be coupled with a linear heat detector 360, as one example. The linear heat detector 360 can be thermocouple wire that is able to accurately detect a fire and also to confirm the general location of a fire. When a fire burns through the linear heat detector 360 the location of the fire is detected by the amount of resistance in the wire. Also, the linear heat detector 360 can determine the heat at that location, so that a fire can be confirmed by that device. Thereafter, the solenoid 368 can be triggered to apply the load 208 to an elongate body 216 or other portion of the fire detection portion 204. The load 208 can move the latch control portion 212 as discussed above. In another embodiment the solenoid 368 can be triggered by an actuator 376 (e.g., a switch or button or a mechanical lever) that can be disposed on or in a cab of a vehicle.

Figure 12D:
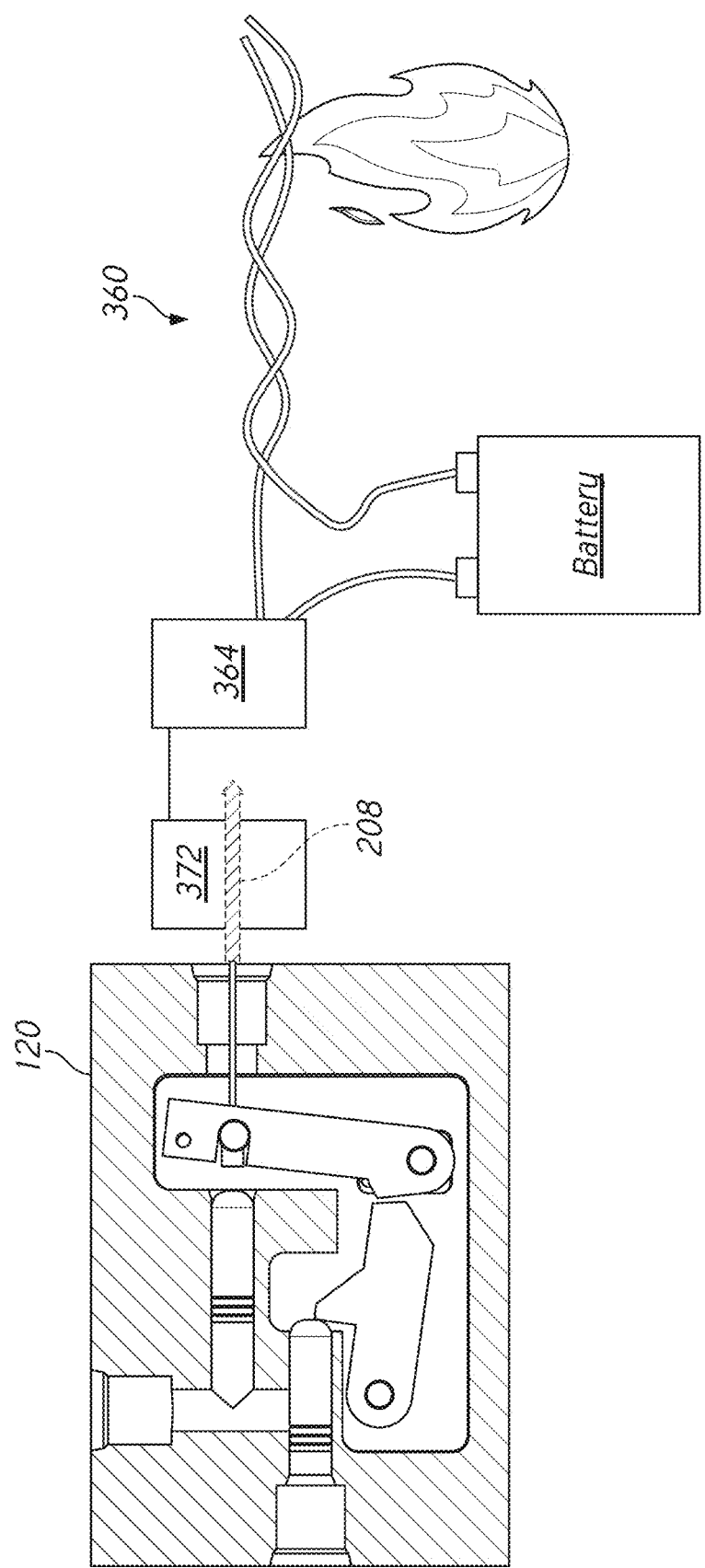
FIG. 12D shows a pressure relief valve with a trigger assembly having a linear heat detector configured to detect a fire or other thermal event and to engage a motor to apply a load to cause a pressure relief valve to vent gas.

FIG. 12D shows another embodiment similar to that of FIG. 12C but with the load 208 generated by a motor 372. The motor 372 can be operated by the processor 364 in communication with a thermocouple wire or other linear heat detector 360.

Figure 12E:
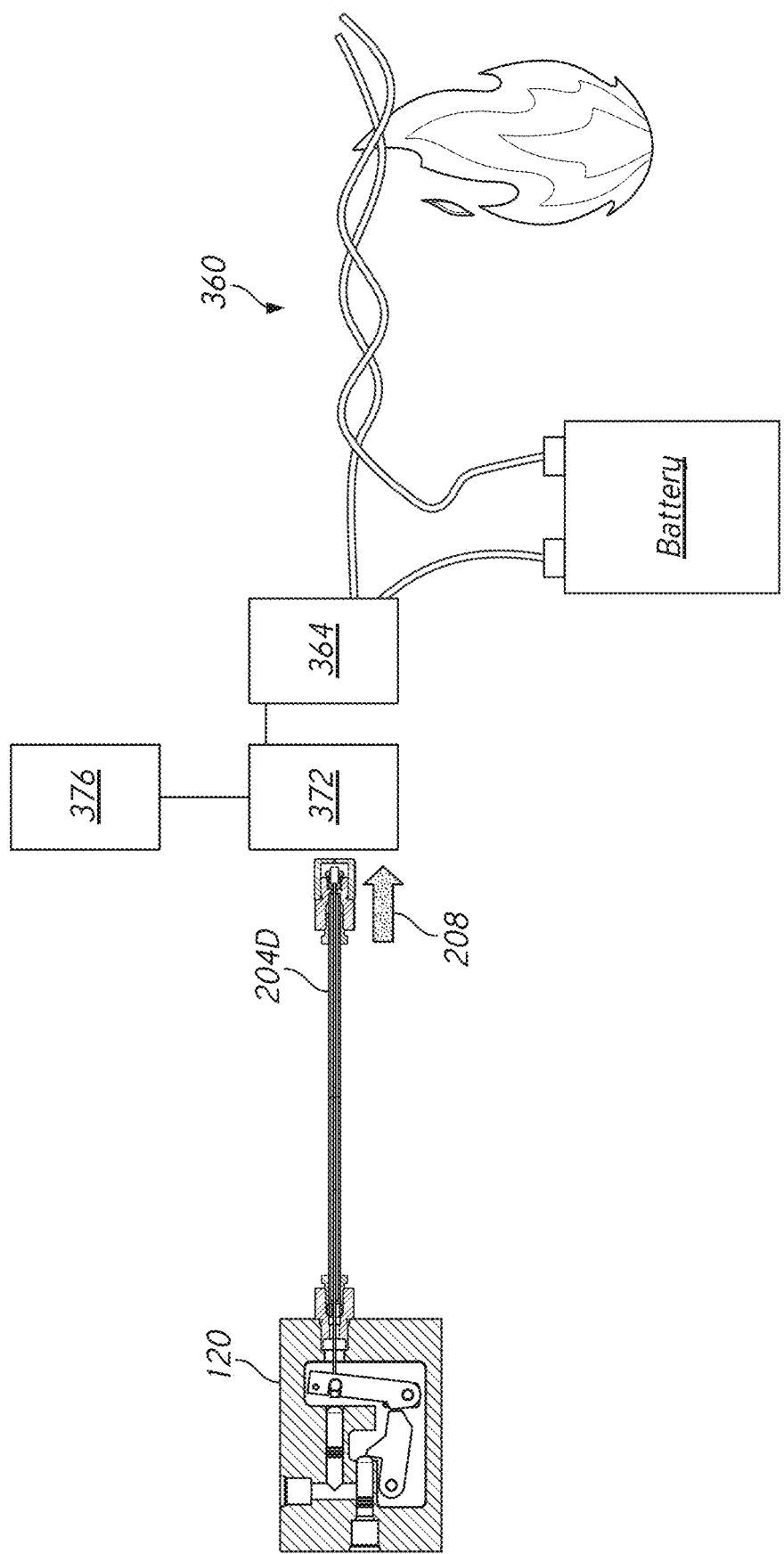
FIG. 12E shows that in one embodiment a pressure relief valve with a trigger assembly can be triggered by any one or more than one of an actuator, a motor and/or a solenoid, which may be coupled with a linear heat detector to detect a fire or other thermal event and to cause a pressure relief valve to vent gas.

FIG. 12E illustrates a thermal management system that combines the trigger function of the fire detection portion 204E, e.g., a shape memory alloy wire, with active heat detection, e.g., in a linear heat detector 360. If a thermal event occurs in the vicinity of the fire detection portion 204E, the fire detection portion 204E can change dimension, e.g., lengthen or shorten, to cause the pressure relief valve 120 to vent gas. On the other hand, if the linear heat detector 360 responds to a thermal event to provide a signal to the processor 364 coupled with the linear heat detector 360, the processor can engage the motor 372 (or a solenoid 368) coupled with the processor and with the latch control portion of the trigger assembly of the pressure relief valve 120 to cause the valve to vent. In some cases, an actuator 376 is provided to engage the motor 372 (or a solenoid 368) to allow for manual venting. The actuator 376 can be located in a cab of a vehicle, in a FMM, or elsewhere in an accessible location of the vehicle or wirelessly from a wireless controller or other wireless device. Thus in the thermal management system of FIG. 12E a load 208 can be generated in or from any one or more of a plurality control thermal event detection and/or control systems.

In further variations of the foregoing, a thermal sensor of another type can be employed. For example, one or more point sources can be employed to detect elevated temperatures and to trigger the solenoid 368 or the motor 372 to apply the load 208. A point source detector or array of such detectors could also be used to trigger the release of a pressurized gas to actuate one or more trigger pistons 292 of one or more pressure relief valves 120 to cause the latch control portion 212 to move to allow the first branch 138 and the second branch 140 of the vent passage 124 to be placed in fluid communication with each other in one or more pressure relief valves 120 of the gas containment system 100 or the gas containment system 100A.

As discussed above, sympathetic venting can be provided by a common venting passage, e.g., through pressure in a portion of the second branch 140 of the vent passage 124, or by a dedicated sympathetic pressure channel. FIGS. 3-3B show details of a dedicated passage sympathetic venting arraignment. An inlet end 316 of a trigger actuation passage 280 can be provided at a periphery of the body 122. The trigger actuation passage 280 can include a first branch extending from the inlet end 316 to a second branch. The first branch of the inlet end 316 can be fluidly isolated from the vent passage 124, e.g., from the second branch 140 thereof. The second branch of the trigger actuation passage 280 can have the trigger piston 292 disposed therein. Separating the trigger actuation passage 280 from the vent passage 124 has the advantage of allowing the size of the trigger actuation passage 280 to be formed based solely or primarily on operation of the trigger piston 292. For example a gas or other fluid needed to move the trigger piston 292 need not fill the entirety of the second branch 140 to build pressure to move the trigger piston 292. Separating the trigger actuation passage 280 from the vent passage 124 also allows these passages to be sized for the specific application they are directed to and also allows for independent testing of the functions thereof.

Figure 13:
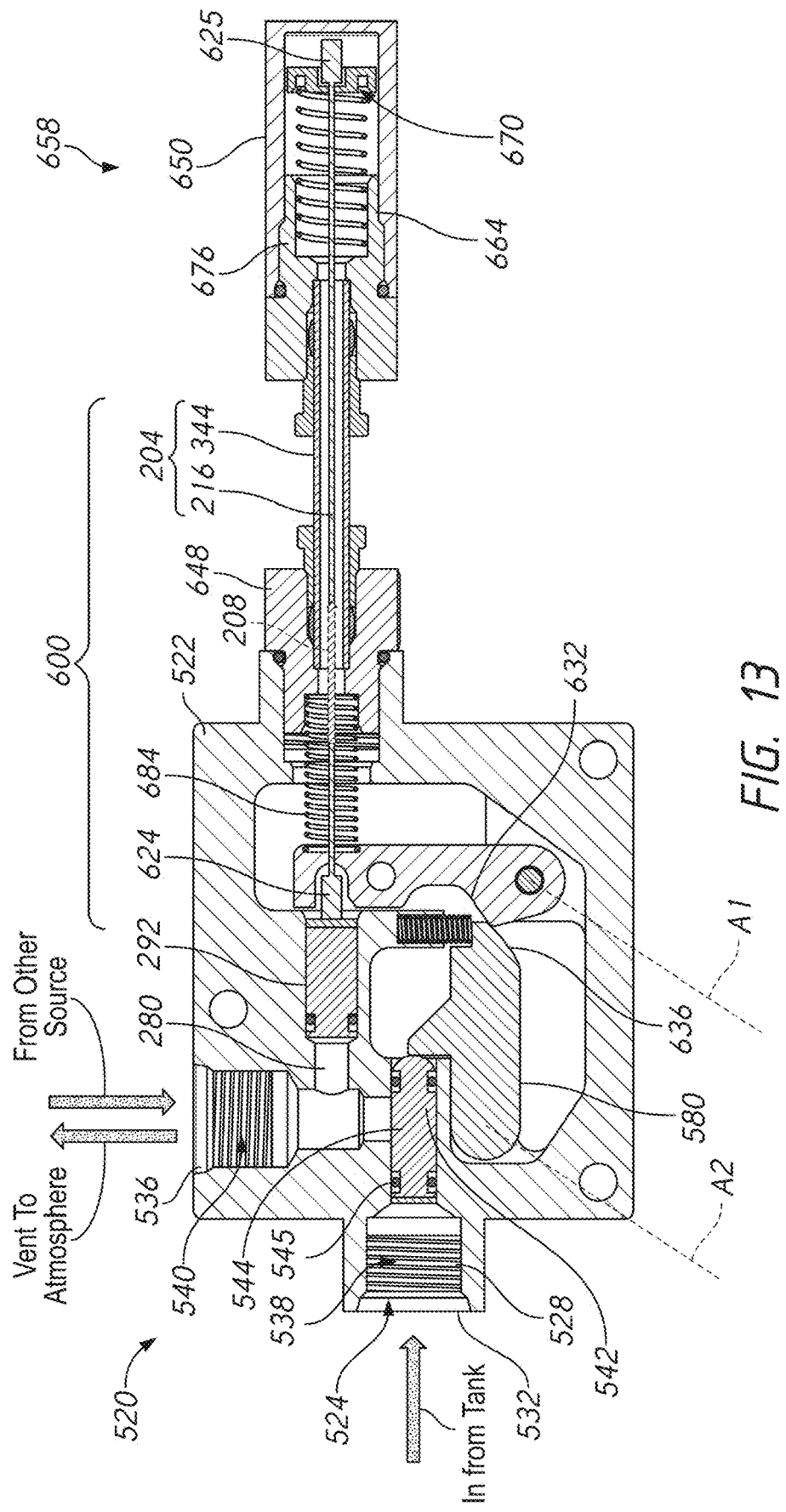
FIG. 13 is a cross-sectional view of another embodiment of a pressure relief valve.
Figure 13A:
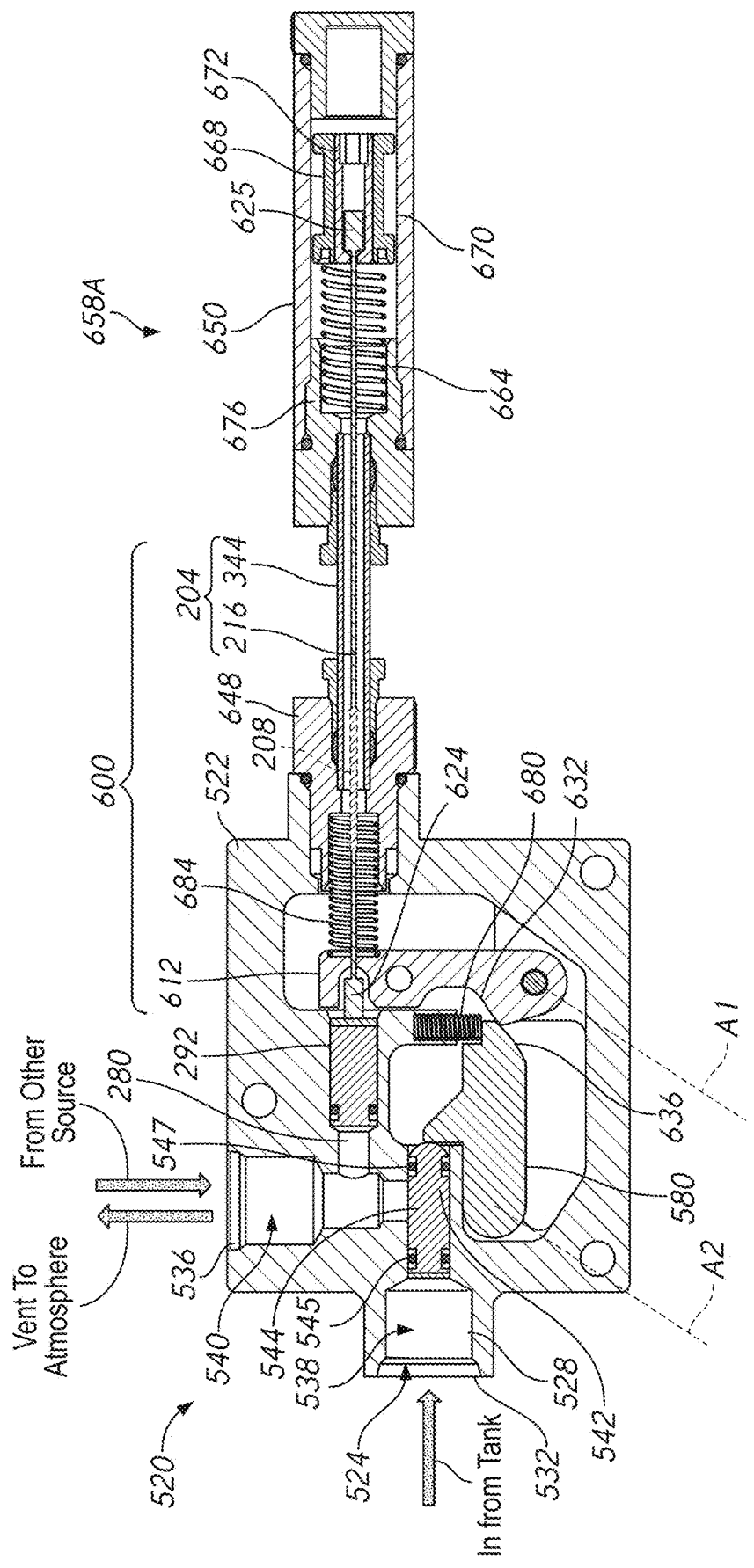
FIG. 13A is a cross-sectional view of another embodiment of a pressure relief valve.
Figure 14:
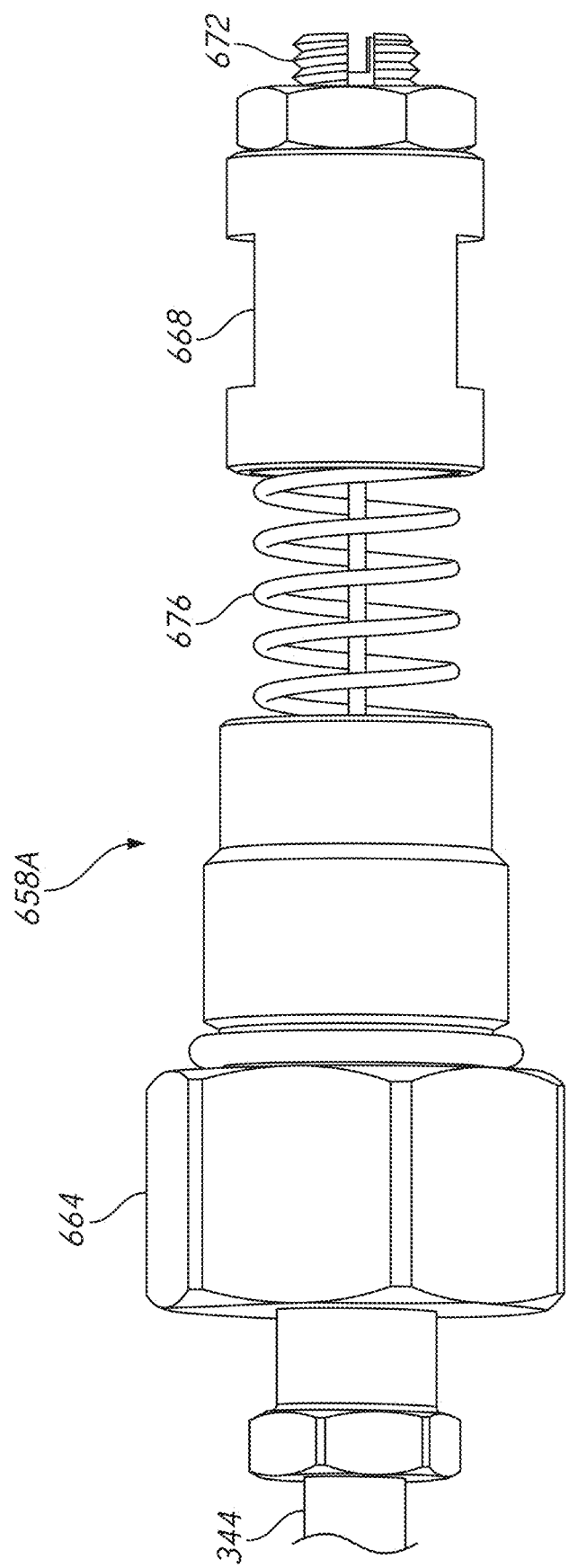
FIG. 14 is a side view of a portion of a delay spring assembly configured to aid in the control of the pressure relief valve of FIG. 13.
Figure 15:
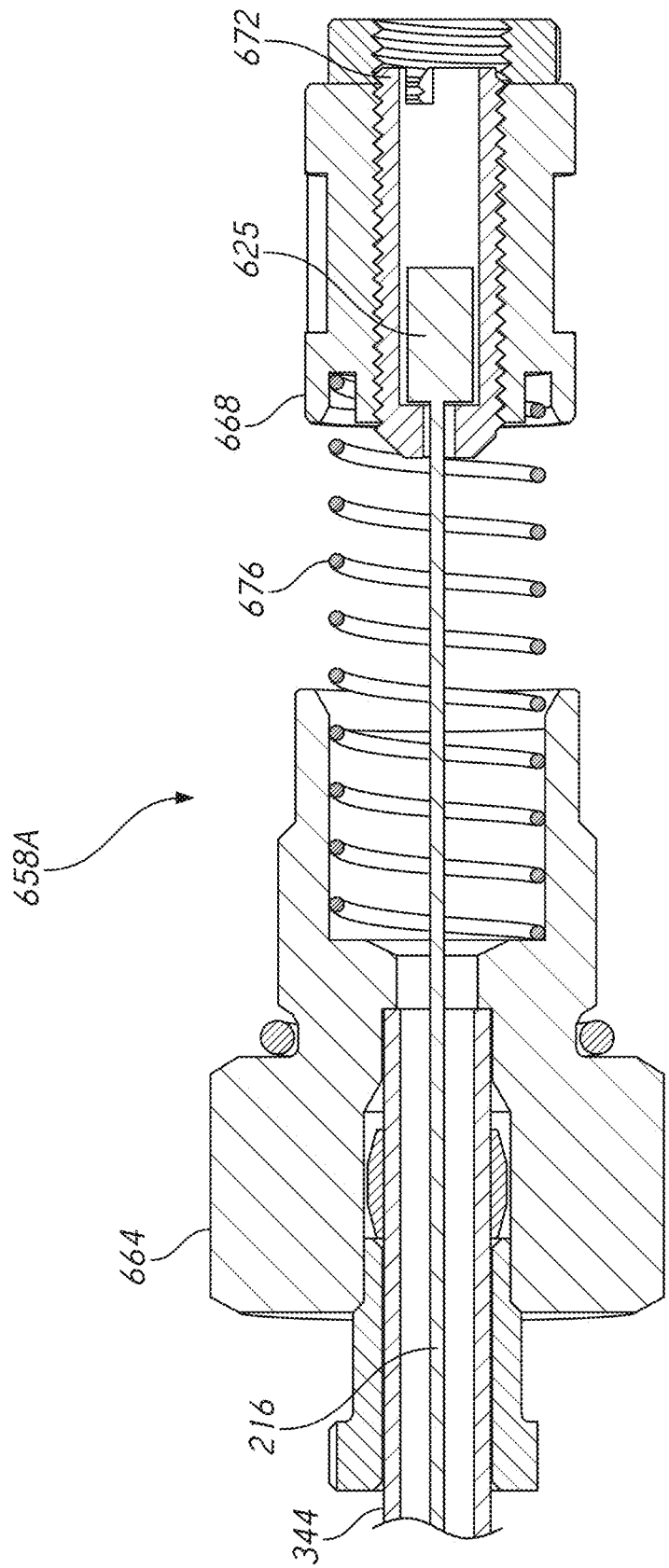
FIG. 15 is a cross-sectional view of the portion of the delay spring assembly shown in FIG. 14.

FIGS. 13-15 show another embodiment of a pressure relief valve 520 that can be used in any of the gas containment systems disclosed herein or covered by the claims hereof, including the gas containment system 100, the gas containment system 100A and the variations depicted and described above. The pressure relief valve 520 can include a fire detection portion 204 that can be part of a trigger assembly 600. The response of the fire detection portion 204 to a fire or thermal event can be modulated by a delay spring assembly 658 or a delay spring assembly 658A, to be discussed below.

The pressure relief valve 520 includes a body 522 with a plurality of cavities in which one or a plurality of valve components can be housed. The body 522 can also define one or a plurality of gas passages through which gas can be vented. The body 522 can include a vent passage 524 enclosed by a wall 528. The vent passage 524 can extend from a first end 532 to a second end 536. The first end 532 can be placed in fluid communication with a tank 104, 104A, 104B, and/or 104C enclosing a gas at pressure. The gas can be fuel for an internal combustion engine. The vent passage 524 can have a first branch 538 that extends between the first end 532 and a plug 542. The vent passage 524 can have a second branch 540 that extends between the plug 542 and the second end 536. The plug 542 can include a piston 544 slidably disposed in a passage of the body 522. The piston 544 can be disposed in a passage extending, at least partially, between the first branch 538 and the second branch 540. A portion of the passage enclosing the plug 542 can extend to a cavity enclosing one or more components of the valve. The plug 542 can also include an O-ring 545 or other seal that causes pressure to build in the first branch 538 as gas flows from the tank to the pressure relief valve 520 through the first end 532. The plug 542 can include an O-ring 547 or other seal in a portion of the passage in which the piston 544 is disposed, e.g., a portion leading to the cavity housing valve components. The O-ring 547 (or other seal) causes pressure to build in the second branch 540 in a circumstance where gas flows into the second branch 540 from another source. For example, as shown in FIG. 11E gas can flow from the tank 104A along the vent connection conduit 408 to the second branch 540 of the pressure relief valve 520. The pressure in the second branch 540 can move a latch control portion 612 (discussed below) of the pressure relief valve 520 to vent the tank 104B. The O-ring 547 (or other seal) prevents leakage from the second branch 540 to the cavity for valve components, which could lessen the pressure in the second branch 540 of the tank 104B, preventing triggering of the trigger piston 292 therein. The O-ring 547 also can reduce or eliminate the passage of moisture from the vent passage 524, e.g., from the second branch 540 thereof, into the interior of the body 522 to reduce or eliminate the conditions that could result in corrosion of components of the pressure relief valve 520 in the body 522.

The pressure relief valve 520 includes a latch 580 that can prevent movement of the plug 542 absent conditions that would benefit from venting. The latch 580 can be held in position and allowed to move by a latch control portion 612. The latch control portion 612 can include a first surface 632 and the latch 580 can include a second surface 636. One or both of the first surface 632 and the second surface 636 can have a curved profile to facilitate disengagement of the latch control portion 612 from the latch 580. For example, the second surface 636 can be curved to allow the latch 580 to substantially retain its position and to be substantially undeflected by movement of the latch control portion 612. The latch control portion 612 can pivot about an axis A1. The axis A1 is disposed opposite an end of the latch control portion 612 coupled with an end 624 of the fire detection portion 204 disposed in the body 522. The latch 580 can pivot about an axis A2 opposite the second surface 636. Rotation of the latch control portion 612 allows the first surface 632 to move along the second surface 636 and out of contact with the second surface 636 to allow the latch 580 to pivot. As the first surface 632 moves along the second surface 636, the latch 580 maintains a substantially undeflected position, e.g., is not rotated about the axis A2. The latch 580 includes a contact portion disposed between the ends thereof to retain the plug 542 when the pressure relief valve 520 is in the configuration of FIG. 13. The contact portion extends transverse to the longitudinal axis of the latch 580 such that the contact portion is aligned with the longitudinal axis of the piston 544 in the closed configuration depicted in FIG. 13. The movement of the latch 580 can be facilitated by a spring 680 disposed in the body 522. The spring 680 can be in an unloaded state when against a surface in the body 522 when the pressure relief valve 520 is in a closed configuration, as shown in FIG. 13. Movement of the latch 580 about the axis A2 in a clockwise direction can load the spring 680 such that the spring applies a restoring force to move the latch 580 counterclockwise back to the position seen in FIG. 13. The spring 680 can help maintain the position of the latch 580 during assembly of the pressure relief valve 520. In the venting position, fluid communication is provided or enhanced between the first branch 538 and the second branch 540 of the vent passage 524. The end of the piston 544 exposed to the first branch 538 can be shifted to be at least partially to the right of the second branch 540 when the plug 542 is in the venting position.

The trigger assembly 600 can include a first fixed end 648 coupled with a portion of the body 522 and a second fixed end 650 disposed opposite the first fixed end 648. The fire detection portion 204 can include an elongate body 216 disposed within a tubular body 344 The tubular body 344 can be secured to the second fixed end 650 at one end and to the first fixed end 648 at a second end opposite the first end. The tubular body 344 can house the elongate body 216 therein. The elongate body 216 can have an end 624 coupled with the latch control portion 612 and an end 625 disposed in the second fixed end 650. An end of the elongate body 216 can be disposed in a delay spring assembly. For example, the end 625 can be disposed in and can be part of the delay spring assembly 658. The end 625 of the elongate body 216 disposed in the second fixed end 650 can be held in a predetermined position prior to loading (as in FIG. 13) or can be allowed to move to provide for adjusting the response of the pressure relief valve 520 (as in FIGS. 13A-15). The end 624 can be disposed in and can be part of a delay spring assembly 658B as discussed below in connection with FIG. 16.

FIG. 13 shows that in one embodiment the pressure relief valve 520 includes a spring 684 disposed between a wall of the body 522 and the latch control portion 612. The spring 684 can be loaded to retain the latch control portion 612 in the body 522 in a position to hold a trigger piston 292 in sealed position or configuration in the trigger actuation passage 280. A spring disposed in the second fixed end 650 can retain the end 625 of the elongate body 216 in a position prior to the load 208 being applied to the elongate body 216. The end 625 of the elongate body 216 can move within the second fixed end 650. The movement can include initial movement wherein the end 625 moves toward the end 624 without causing the elongate body 216 to apply a load to the latch control portion 612 sufficient to move the latch control portion 612. A washer 670 can retain the end 625 of the elongate body 216 in a position that is not adjustable in an unloaded state (e.g., when the load 208 is not being applied). The washer 670 can be moved by the initial movement of the end 625 without causing the elongate body 216 to apply a load to the latch control portion 612 sufficient to move the latch control portion 612.

The delay spring assembly 658 can manage tolerance in the pressure relief valve 520 while maintaining a short stroke for activation of the pressure relief valve. The delay spring assembly 658 operates by compressing a spring 676 disposed between the washer 670 and a wall of the second fixed end 650. Compression of the spring 676 occurs during initial movement of the end 625 and the washer 670 before causing the load 208 to be applied to move the latch control portion 612. For example, if the elongate body 216 comprises a shape memory material and is configured thereby to shorten at or above a threshold temperature, the shortening can result in the washer 670 moving toward an internal wall of the second fixed end 650 against which and end of the spring 676 is disposed. As the spring 676 compresses the washer 670 moves toward and eventually contacts an end surface of the fitting 664. Upon contact between the washer 670 and the end surface of the first fitting 664, additional contraction of the elongate body 216 causes the load 208 to be applied to the latch control portion 612 to move the first surface 632 along the second surface 636 to begin to open the latch 580. The load is applied by subsequent movement following the initial movement of the elongate body 216, e.g., movement of the end 624 of the elongate body 216. The delay spring assembly 658 is counterbalanced by a spring 684 that acts to hold the latch control portion 612 in the position shown in FIG. 13. As the load 208 is applied to the latch control portion 612, the spring 684 is compressed by movement of the end 624 which causes a rotation (or other movement) of the latch control portion 612.

Figure 16:
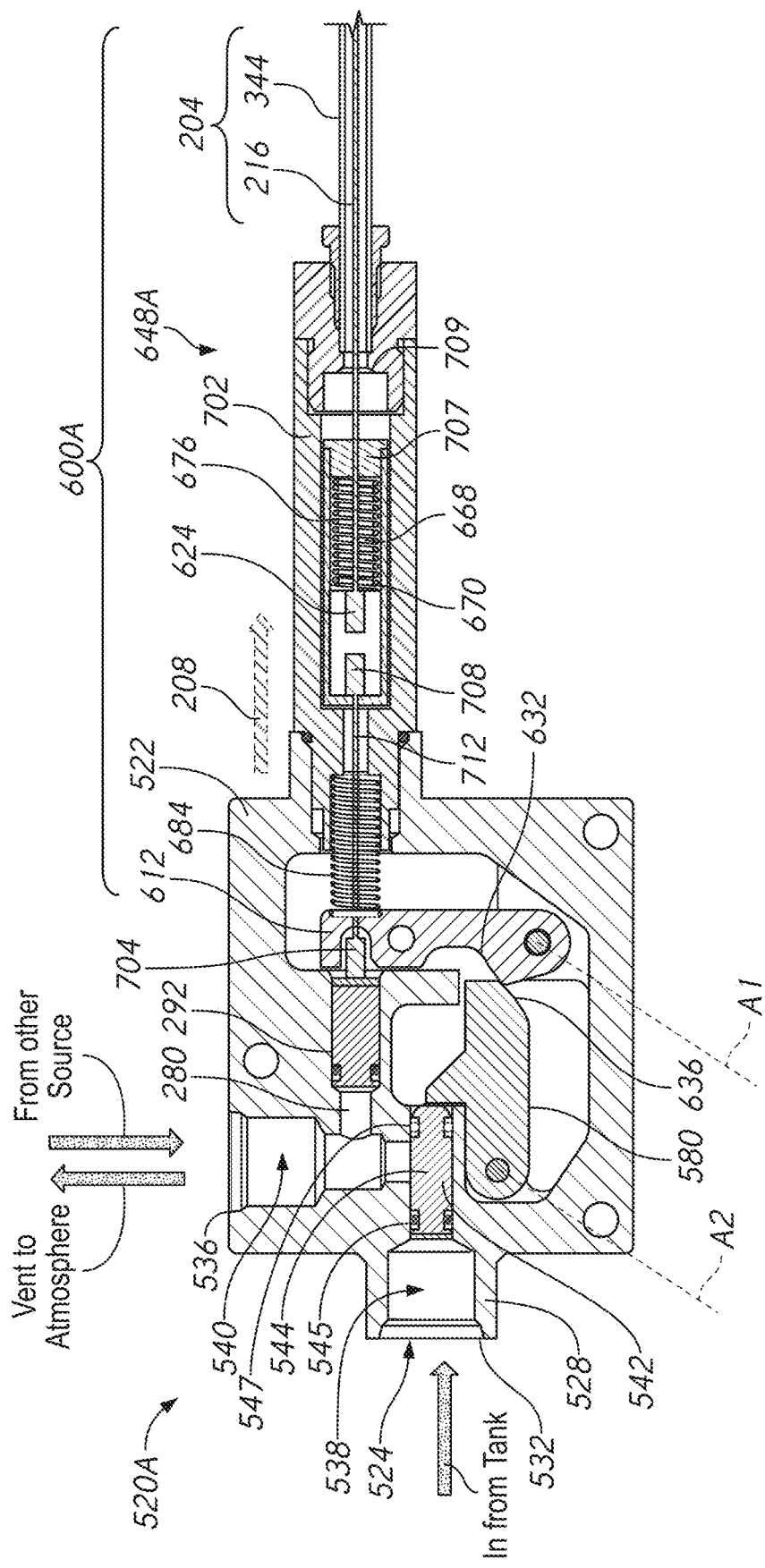
FIG. 16 is a cross-sectional view of another embodiment of a pressure relief valve.

In one variation shown in FIG. 16, a delay spring assembly 658B is disposed in a first fixed end 648A of a trigger assembly 600A of a pressure relief valve 520B. The end 624 of the elongate body 216 can be allowed to move within the first fixed end 648A to compress a spring 676 that can be disposed between the end 624 and a wall in the first fixed end 648A. As such, the end 624 can undergo initial movement that precedes a load 208 being applied to the latch control portion 612. After the spring 676 disposed in the first fixed end 648A is compressed, the elongate body 216 causes the load 208 to be applied to the latch control portion 612. In one variation, the elongate body 216 is configured such that the end 624 is located in a tubular body 702 fixed to the body 522 of the pressure relief valve 520B. A second fitting 668 is slideably disposed in the tubular body 702. A washer 670 is disposed between the end 624 and the spring 676 such that movement of the end 624 moves the washer 670. The washer 670 compresses the spring 676 against a wall 707 coupled with the second fitting 668. Upon compression of the spring 676, the second fitting 668 slides away from the body 522 within the washer 670. FIG. 16 shows that the trigger assembly 600A includes another wire or tension member disposed with an end 708 disposed in the second fitting 668. An elongate body 712 coupled with the end 708 extend to an end 702 coupled with the latch control portion 612. Movement of the ends 704, 708 and elongate body 712 applies the load 208 to the latch control portion 612 following compression of the spring 676. In one example, the spring 676 is compressed. Following compression the second fitting 668 and the wall 707 slide away from the body 522. The movement of the latch control portion 612 can be limited by contact between the wall 707 and an internal surface 709 of the first fixed end 648A. In a further variation, two springs 676 can be provided, one at each end of the elongate body 216. Each spring 676 can be compressed allowing some movement of the end 624 and the end 625 before the load 208 is applied to the latch control portion 612. Thus the delay spring assembly 658 can be located at either end or both ends of the trigger assembly 600.

FIGS. 13A-15 show a delay spring assembly 658A that enables adjustment of the response of the trigger assembly 600. The adjustment of the delay spring assembly 658A allows for precise adjustments to a trigger length, which is helpful when bends are included (e.g., as in FIG. 12B). The delay spring assembly 658 As can position the spring 676 disposed between a fitting (here a first fitting 664) and another fitting (here the second fitting 668) in the second fixed end 650. Similar to the discussion above, an adjustable delay spring assembly can be disposed in the first fixed end 648 between two fittings or components, one being moveable relative to the other. The moveable fitting or component also being moveable by the end 625 and/or the end 624. For example, the washer 670 or the wall 707 can be moveable relative to the second fitting 668 prior to exposure of the elongate body 216 to a thermal event to shorten or lengthen the length of the spring 676 in an unloaded state. The spring 676 can have one end retained in a recess of the first fitting 664 and another end coupled with a recess of the second fitting 668. FIG. 15 shows that the position of the end 625 of the elongate body 216 can be shifted by an adjuster 672. The adjuster 672 includes a threaded tubular body configured to be shifted by advancing the adjuster 672 within threads on an inside surface of the second fitting 668. The adjuster 672 can include a channel or lumen configured to receive and retain the end 625 (or the end 624, when the delay spring assembly 658A is in the first fixed end 648, as discussed above). The adjuster 672 has a narrow end configured to retain the end 625 of the elongate body 216, which is enlarged compared to a span of the elongate body 216 disposed between the second fixed end 650 and the first fixed end 648. A portion of the elongate body 216 (e.g., the end 625, the end 624) can extend into the adjuster 672 to be coupled with an enlarged end 625. The spring 676 and the spring 684 can determine when and how the latch control portion 612 moves to open the pressure relief valve 520. In one example, the spring 684 is pre-loaded to hold the latch control portion 612 closed until after the spring 676 is compressed. As the spring 676 is compressed the second fitting 668 and the first fitting 664 move together, e.g., the second fitting 668 slides toward the first fitting 664. Once the second fitting 668 touches the first fitting 664, further shortening of the elongate body 216 applies the load 208 to the latch control portion 612. The adjuster 672 can adjust the length of the spring 676 in the absence of the load 208. As the adjuster 672 is rotated clockwise within the second fitting 668, the fitting 668 moves left in FIG. 15 and the distance to be traveled by the second fitting 668 to contact the first fitting 664 is reduced. As the adjuster 672 is rotated counterclockwise, the second fitting 668 is moved right in FIG. 15 and the distance to be traveled by the second fitting 668 to contact the first fitting 664 is increased. These adjustments can provide a fine tuning of the response of the pressure relief valve 520 to a thermal event.

The description of other features of the pressure relief valve 520 can be the same as the pressure relief valve 120 discussed above, the description of which is incorporated into the description of the pressure relief valve 520.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A pressure relief device comprising:
   a body;
   a vent passage disposed through the body and at least partially enclosed by a vent passage wall, the vent passage having a first end configured to be placed in fluid communication with an internal volume of a tank and a second end configured to be placed in fluid communication with the atmosphere;
   a plug configured to slide along a longitudinal axis of the plug in the vent passage, the plug comprising a seal end forming a seal with the vent passage wall and a control end spaced apart from the seal end; and
   a latch comprising an elongate body extending from a proximal end to a distal end, the latch being rotatably mounted to the body at a location that defines an axis, and having a blocking portion projecting laterally from the elongate body between the proximal end and the distal end, the latch being configured to move from a first position to a second position when rotated about the axis, causing the blocking portion to be out of contact with the control end of the plug to allow movement of the plug in the vent passage and allowing gas in the tank to flow through the pressure relief device to the second end of the vent passage,
   wherein the latch is configured to rotatably move from the first position to the second position in response to pressurized gas from a secondary source entering a trigger actuation passage.

2. The pressure relief device of claim 1, further comprising a shape memory alloy wire configured to shorten when exposed to a temperature above a threshold temperature to cause the latch to rotatably move from the first position to the second position, allowing the plug to move in the vent passage to allow the gas in the tank to flow through the pressure relief device to the second end of the vent passage and out of the pressure relief device to the atmosphere.

3. The pressure relief device of claim 1, wherein the latch is rotatably mounted to the body at the proximal end of the latch.

4. The pressure relief device of claim 1, wherein the blocking portion comprises a proximal-facing contact portion that is disposed in contact with the control end of the plug in the first position.

5. The pressure relief device of claim 2, further comprising a trigger member coupled with the shape memory alloy wire, the trigger member having a surface configured to be in a blocking position to retain the latch in the first position and to be in a non-blocking position allowing the latch to be in the second position.

6. The pressure relief device of claim 2, wherein the shape memory alloy wire is disposed in a tubular body having fixed ends, the shape memory alloy wire being allowed to move along a longitudinal axis of the tubular body relative to the tubular body.

7. The pressure relief device of claim 1, wherein, in the first position, a longitudinal direction along which the elongate body of the latch extends is parallel to the longitudinal axis of the plug.

8. The pressure relief device of claim 1, wherein the trigger actuation passage is fluidly coupled to the vent passage.

9. A pressure relief device configured to vent a pressurized tank in the event of a fire, the pressure relief device comprising:
a body;
a vent passage at least partially enclosed by a vent passage wall disposed through the body, the vent passage having an upstream segment and a downstream segment;
a plug configured to slide along a longitudinal axis of the plug in the vent passage, the plug comprising a seal end forming a seal with the vent passage wall and a control end spaced apart from the seal end;
a trigger assembly comprising a pivotable lever arm comprising a control surface; and
a latch rotatably mounted to the body and contacting the control surface of the pivotable lever arm and the control end of the plug when the latch is in a first position, and the latch being rotatable such that the latch is out of contact with the control surface of the pivotable lever arm and the control end of the plug in a second position to allow movement of the plug in the vent passage.

10. The pressure relief device of claim 9, wherein the trigger assembly further comprises a shape memory alloy wire configured to shorten when exposed to a temperature above a threshold temperature to pivot the pivotable lever arm and thereby to allow the latch to be in the second position to allow movement of the plug in the vent passage to cause the downstream segment of the vent passage to fluidly communicate with the upstream segment of the vent passage.

11. The pressure relief device of claim 9, further comprising:
a trigger actuation passage having a first end configured to be in fluid communication with a pressurized gas and a second end disposed adjacent to the pivotable lever arm of the trigger assembly; and
a trigger piston disposed in the trigger actuation passage, the trigger piston having a first end slideably mounted in the trigger actuation passage and a second end being adjacent to or contacting the pivotable lever arm in a first position of the trigger piston;
wherein when the pressurized gas above a threshold pressure is introduced into the trigger actuation passage from a source downstream of the plug the trigger piston is moved within the trigger actuation passage to a second position to pivot the pivotable lever arm to permit the latch to be actuated between the first position and the second position thereof.

12. The pressure relief device of claim 11, wherein the trigger actuation passage is fluidly coupled to the vent passage.

13. The pressure relief device of claim 9, wherein, in the first position, a longitudinal direction along which an elongate body of the latch extends is parallel to the longitudinal axis of the plug.

14. The pressure relief device of claim 10, further comprising a delay spring assembly, the delay spring assembly comprising a first fitting, a second fitting, and a spring disposed between the first fitting and the second fitting,
wherein the shape memory alloy wire comprises a first end and a second end, and
wherein the second end of the shape memory alloy wire is coupled to the second fitting by an adjuster that is configured to set a length of the spring in a state prior to exposure of the shape memory alloy wire to the temperature above the threshold temperature.

15. The pressure relief device of claim 9, wherein the pivotable lever arm rotates in a first rotational direction to cause the control surface of the pivotable lever arm to become out of contact with the latch, and
wherein the latch rotates in the first rotational direction when moving from the first position to the second position.

16. The pressure relief device of claim 11, wherein the trigger actuation passage is fluidly coupled to the vent passage.

17. The pressure relief device of claim 10, wherein shape memory alloy wire is coupled to the pivotable lever arm at a first location of the pivotable lever arm,
wherein the pivotable lever arm is pivotably mounted within the body at a second location of the pivotable lever arm, and
wherein the control surface is disposed at a third location between the first location and the second location.

18. A pressure relief device comprising:
a body;
a vent passage disposed through the body and at least partially enclosed by a vent passage wall, the vent passage having a first end configured to be placed in fluid communication with an internal volume of a tank and a second end configured to be placed in fluid communication with the atmosphere;
a plug moveably disposed in the vent passage, the plug comprising a seal end forming a seal with the vent passage wall and a control end spaced apart from the seal end; and
a latch comprising an elongate body extending from a proximal end to a distal end, the latch being rotatably mounted to the body at a location that defines an axis, and having a blocking portion projecting laterally from the elongate body between the proximal end and the distal end, the latch being configured to move from a first position to a second position when rotated about the axis, causing the blocking portion to be out of contact with the control end of the plug to allow movement of the plug in the vent passage and allowing gas in the tank to flow through the pressure relief device to the second end of the vent passage, wherein the latch is configured to rotatably move from the first position to the second position in response to pressurized gas from a secondary source entering the second end of the vent passage.

19. The pressure relief device of claim 18, wherein the latch is rotatably mounted to the body at the proximal end of the latch.

20. The pressure relief device of claim 18, wherein the blocking portion comprises a proximal-facing contact portion that is disposed in contact with the control end of the plug in the first position.

21. The pressure relief device of claim 18, wherein, in the first position, a longitudinal direction along which the elongate body of the latch extends is parallel to a longitudinal axis of the plug.

22. The pressure relief device of claim 18, further comprising a pivotable lever arm having a control surface configured to be in contact with the latch when the latch is in the first position, wherein the pressurized gas introduced into the vent passage causes the pivotable lever arm to rotate, which causes the latch to be out of contact with the control surface of the pivotable lever arm.

23. The pressure relief device of claim 22, wherein the pivotable lever arm rotates in a first rotational direction to cause the control surface of the pivotable lever arm to become out of contact with the latch, and wherein the latch rotates in the first rotational direction when moving from the first position to the second position.

* * * * *